United States Patent
Bacarella et al.

(10) Patent No.: US 9,867,017 B1
(45) Date of Patent: Jan. 9, 2018

(54) SCHEDULING OPTIMIZED CHARGING OF BATTERY ENABLED DEVICES BASED ON BATTERY USAGE IMPACT FACTORS AND PREDICTED USAGE RECEIVED FROM MULTIPLE SOURCES

(71) Applicant: INTERNATIONAL BUSINESS MACHINES CORPORATION, Armonk, NY (US)

(72) Inventors: David J. Bacarella, Naperville, IL (US); Lawrence Candes, Jersey City, NJ (US); Ying Chen, San Jose, CA (US); Aaron M. Cohen, Westford, MA (US); Ravi Mani, Scarsdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/333,122

(22) Filed: Oct. 24, 2016

(51) Int. Cl.
*H04W 24/00* (2009.01)
*H04W 4/02* (2009.01)
(Continued)

(52) U.S. Cl.
CPC .......... *H04W 4/028* (2013.01); *H02J 7/0021* (2013.01); *H04W 52/0258* (2013.01);
(Continued)

(58) Field of Classification Search
None
See application file for complete search history.

(56) References Cited

U.S. PATENT DOCUMENTS

| 9,125,012 B2 | 9/2015 | Pelletier et al. |
| 2012/0133337 A1 | 5/2012 | Rombouts et al. |

(Continued)

FOREIGN PATENT DOCUMENTS

| WO | 2011014667 | 3/2011 |
| WO | 2014046992 A1 | 3/2014 |
| WO | 2015011746 A1 | 1/2015 |

OTHER PUBLICATIONS

Ravenscraft, Eric, "The Coolest Things You Can Automatically Add to a Google Calendar", Apr. 11, 2014, accessible via the Internet at <http://lifehacker.com/the-coolest-things-you-can-automatically-add-to-google-1562119291> as of Oct. 24, 2016, 8 pages.
(Continued)

*Primary Examiner* — Shantell L Heiber
(74) *Attorney, Agent, or Firm* — Feb R. Cabrasawan; Amy J. Pattillo

(57) ABSTRACT

A power service receives a user schedule of one or more events each specifying predicted usage and predicted location for one or more battery enabled mobile devices. The power service accesses one or more battery usage impact factors for each predicted location. The power service analyzes the predicted usage and predicted location for each of the one or more events and the one or more battery usage impact factors to predict at least one recommended charging time and charging location for each of the one or more battery enabled mobile devices. The power service updates the user schedule to specify at least one charging event for each at least one recommended charging time and charging location.

20 Claims, 11 Drawing Sheets

(51) Int. Cl.
  *H04W 52/02* (2009.01)
  *H02J 7/00* (2006.01)
  *H04W 84/12* (2009.01)
  *H04W 84/10* (2009.01)

(52) U.S. Cl.
  CPC .... *H02J 2007/0096* (2013.01); *H04W 84/105* (2013.01); *H04W 84/12* (2013.01)

(56) References Cited

U.S. PATENT DOCUMENTS

| | | | |
|---|---|---|---|
| 2012/0254634 A1* | 10/2012 | Chakra | G06F 1/28 713/300 |
| 2013/0024035 A1 | 1/2013 | Ito et al. | |
| 2013/0262366 A1 | 10/2013 | Hjelm | |
| 2013/0310022 A1 | 11/2013 | Daniel | |
| 2014/0191722 A1 | 7/2014 | Usuki et al. | |
| 2014/0217976 A1 | 8/2014 | McGrath et al. | |
| 2014/0239733 A1 | 8/2014 | Mach | |
| 2015/0223025 A1 | 8/2015 | Avital | |
| 2015/0323974 A1* | 11/2015 | Shuster | G06F 1/3212 713/320 |
| 2016/0021546 A1 | 1/2016 | Cuervo | |
| 2016/0132947 A1 | 5/2016 | Bollman, IV | |
| 2016/0275400 A1 | 9/2016 | Hodges | |

OTHER PUBLICATIONS

"Optimization of a Battery Charging Schedule in a Net Zero Energy House using Vehicle-to-Home functionality", accessible via the Internet at <http://www.ibpsa.org/proceedings/eSimPapers/2014/2A.1.pdf> as of Jul. 2, 2016, 13 pages.

Chen, Brian X., "Tips and Myths about Extending Smartphone Battery Life", The New York Times Company, Feb. 24, 2016, 11 pages.

"List of IBM Patents or Patent Applications Treated as Related", dated Oct. 24, 2016, 2 pages.

U.S. Appl. No. 15/333,118, filed Oct. 24, 2016, In re Bacarella, 91 pages.

U.S. Appl. No. 15/333,131, filed Oct. 24, 2016, In re Bacarella, 85 pages.

U.S. Appl. No. 15/333,140, filed Oct. 24, 2016, In re Bacarella, 88 pages.

U.S. Appl. No. 15/333,152, filed Oct. 24, 2016, In re Bacarella, 92 pages.

Non-Final Office Action, dated Feb. 27, 2017, U.S. Appl. No. 15/333,131, filed Oct. 24, 2016, In re Bacarella, 24 pages.

Non-Final Office Action, dated Jun. 21, 2017, U.S. Appl. No. 15/333,140, filed Oct. 24, 2016, In re Bacarella, 40 pages.

Non-Final Office Action, dated Feb. 23, 2017, U.S. Appl. No. 15/333,118, filed Oct. 24, 2016, In re Bacarella, 29 pages.

Final Office Action, dated Aug. 24, 2017, U.S. Appl. No. 15/333,131, filed Oct. 24, 2016, In re Bacarella, 29 pages.

Final Office Action, dated Aug. 23, 2017, U.S. Appl. No. 15/333,118, filed Oct. 24, 2016, In re Bacarella, 35 pages.

Notice of Allowance, dated Oct. 27, 2017, U.S. Appl. No. 15/333,140, filed Oct. 24, 2016, In re Bacarella, 31 pages.

Notice of Allowance, dated Nov. 14, 2017, U.S. Appl. No. 15/333,131, filed Oct. 24, 2016, In re Bacarella, 26 pages.

* cited by examiner

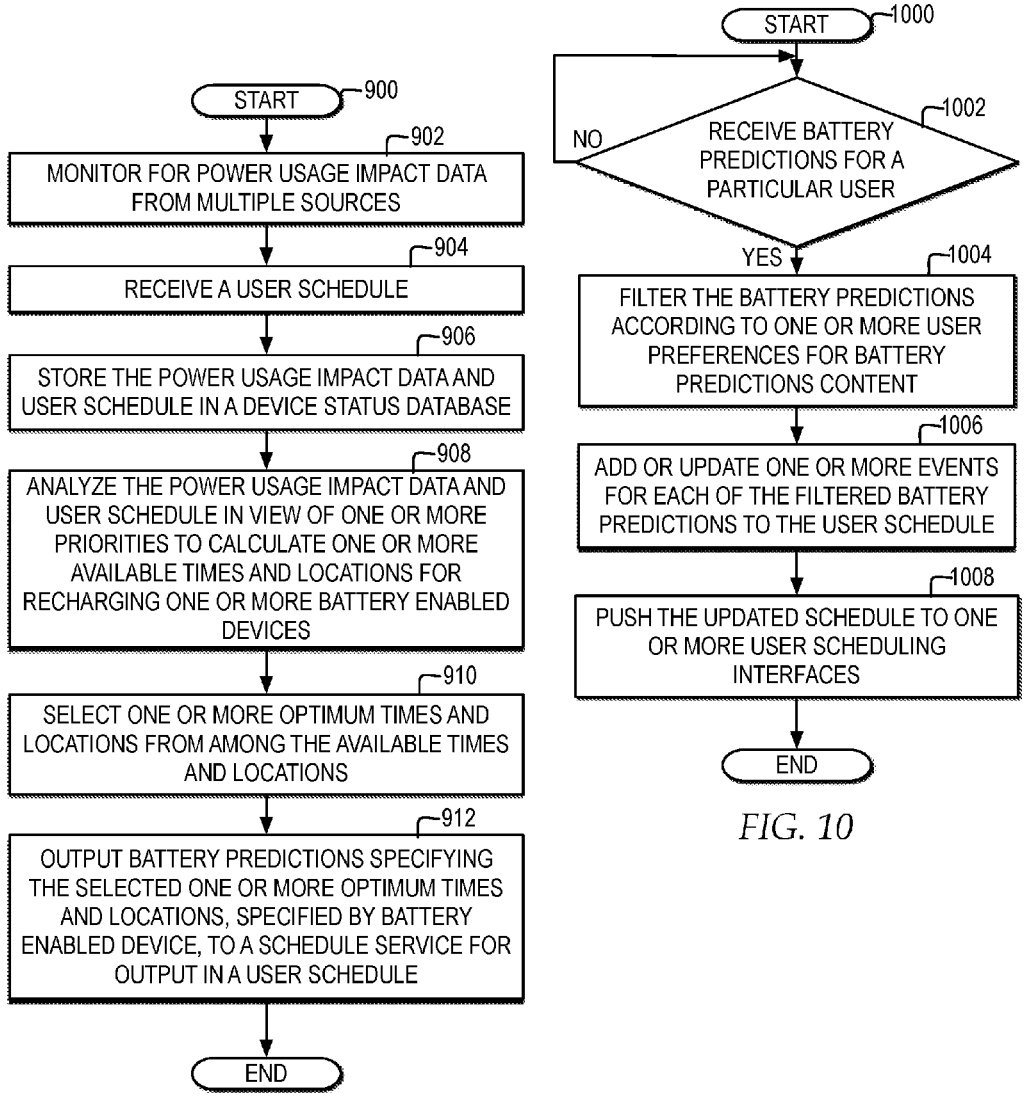

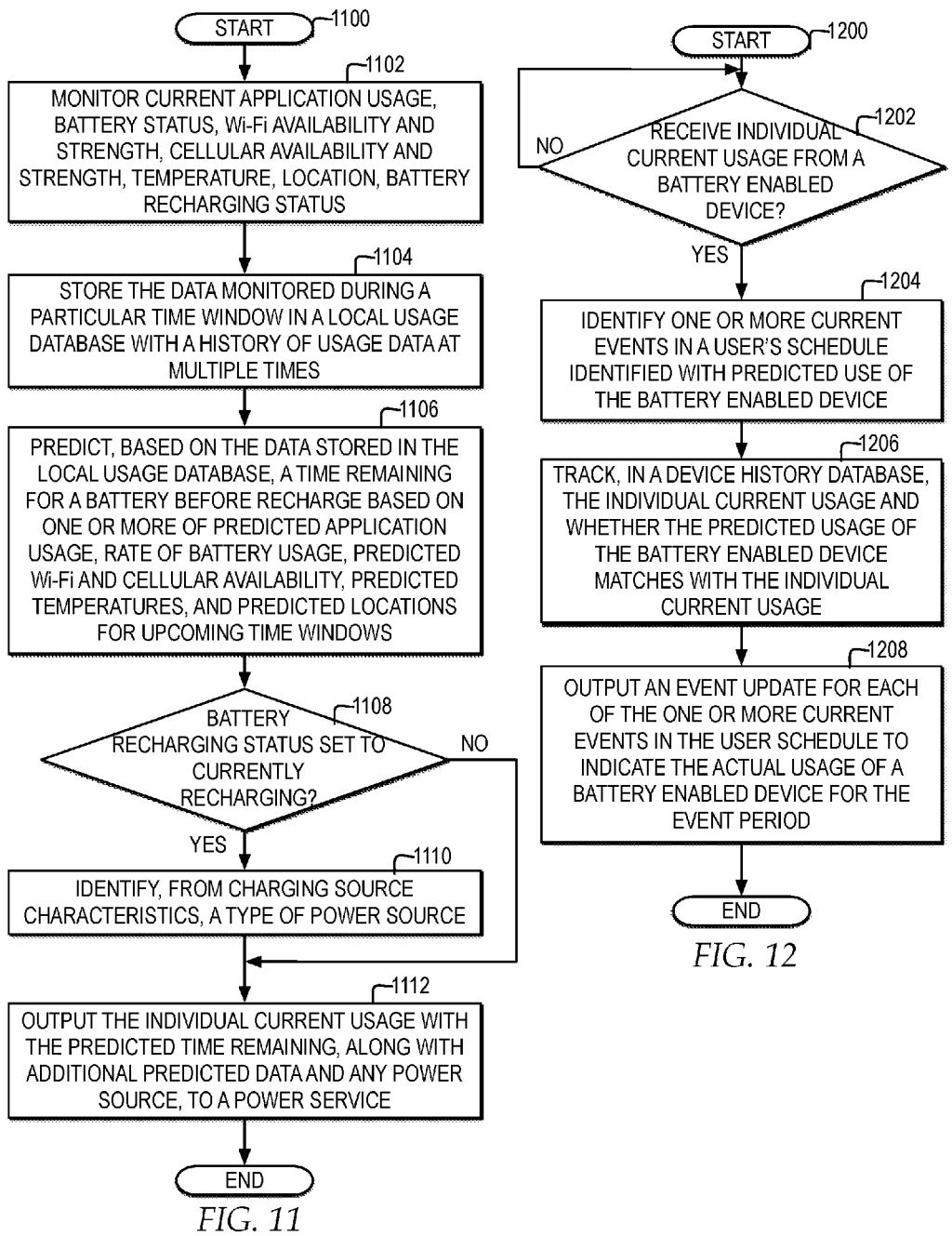

SCHEDULING OPTIMIZED CHARGING OF BATTERY ENABLED DEVICES BASED ON BATTERY USAGE IMPACT FACTORS AND PREDICTED USAGE RECEIVED FROM MULTIPLE SOURCES

BACKGROUND

1. Technical Field

One or more embodiments of the invention relate generally to data processing and particularly to selecting and scheduling optimized times and locations for charging battery enabled devices based on battery usage impact factors and predicted usage received from multiple sources.

2. Description of the Related Art

The number of people who carry and use portable computing devices on a daily basis continues to increase. Portable computing devices that are enabled to receive power from a rechargeable battery allow users to use the portable computing devices from locations chosen by the user, independent of whether the user has access a power outlet. Rechargeable batteries have a limited amount of power available per charge, requiring the user to eventually recharge the batteries to continue using the portable computing device in locations away from power outlets.

BRIEF SUMMARY

In one embodiment, a method is directed to receiving, by a computer system, a user schedule of one or more events each specifying predicted usage and predicted location for future use of one or more battery enabled mobile devices at a predicted time. The method is directed, for each event of the one or more events, to accessing, by the computer system, one or more battery usage impact factors for each predicted location, the one or more battery usage impact factors comprising a predicted temperature at the predicted location at the predicted time and a predicted access level to wireless network service and cellular network service for each predicted location, the one or more battery usage impact factors impacting performance of a separate battery within each of the plurality of battery enabled devices. The method is directed to analyzing, by the computer system, the predicted usage and predicted location for each of the one or more events and the one or more battery usage impact factors to predict at least one recommended charging time and charging location for each of the one or more battery enabled mobile devices. The method is directed to updating, by the computer system, the user schedule to specify at least one charging event for each at least one recommended charging time and charging location. The method is directed to monitoring, by the computer system, the actual temperature at the predicted location when a current time matches the predicted time and the actual access level to the wireless network service and cellular network service when a current time matches the predicted time. The method is directed to dynamically adjusting the at least one recommended charging time and charging location for each of the one or more battery enabled mobile devices according to at least one difference impacting performance of the separate battery between at least one of the actual temperature and the predicted temperature and the actual access level to the wireless network service and cellular network service and the predicted access level.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to receive a user schedule of one or more events each specifying predicted usage and predicted location for future use of one or more battery enabled mobile devices at a predicted time. The stored program instructions comprise program instructions, for each event of the one or more events, to access one or more battery usage impact factors for each predicted location, the one or more battery usage impact factors comprising a predicted temperature at the predicted location at the predicted time and a predicted access level to wireless network service and cellular network service for each predicted location, the one or more battery usage impact factors impacting performance of a separate battery within each of the plurality of battery enabled devices. The stored program instructions comprise program instructions to analyze the predicted usage and predicted location for each of the one or more events and the one or more battery usage impact factors to predict at least one recommended charging time and charging location for each of the one or more battery enabled mobile devices. The stored program instructions comprise program instructions to update the user schedule to specify at least one charging event for each at least one recommended charging time and charging location. The stored program instructions comprise program instructions to monitor the actual temperature at the predicted location when a current time matches the predicted time and the actual access level to the wireless network service and cellular network service when a current time matches the predicted time. The stored program instructions comprise program instructions to dynamically adjust the at least one recommended charging time and charging location for each of the one or more battery enabled mobile devices according to at least one difference impacting performance of the separate battery between at least one of the actual temperature and the predicted temperature and the actual access level to the wireless network service and cellular network service and the predicted access level.

In another embodiment, a computer program product comprises a computer readable storage medium having program instructions embodied therewith, wherein the computer readable storage medium is not a transitory signal per se. The program instructions executable by a computer to cause the computer to receive, by the computer, a user schedule of one or more events each specifying predicted usage and predicted location for future use of one or more battery enabled mobile devices at a predicted time. The program instructions executable by a computer to cause the computer, for each event of the one or more events, to access, by the computer, one or more battery usage impact factors for each predicted location, the one or more battery usage impact factors comprising a predicted temperature at the predicted location at the predicted time and a predicted access level to wireless network service and cellular network service for each predicted location, the one or more battery usage impact factors impacting performance of a separate battery within each of the plurality of battery enabled devices. The program instructions executable by a computer to cause the computer to analyze, by the computer, the predicted usage and predicted location for each of the one or more events and the one or more battery usage impact factors to predict at least one recommended charging time and charging location for each of the one or more battery enabled mobile devices. The program instructions executable by a computer to cause the computer to update, by the computer, the user schedule to specify at least one charging event for each at least one recommended charging time and charging location. The program instructions executable by a computer to cause the computer to monitor the actual temperature at the predicted location when a current time matches the predicted time and the actual access level to the wireless network service and cellular network service when a current time matches the predicted time. The program instructions executable by a computer to cause the computer to dynamically adjust the at least one recommended charging time and charging location for each of the one or more battery enabled mobile devices according to at least one difference impacting performance of the separate battery between at least one of the actual temperature and the predicted temperature and the actual access level to the wireless network service and cellular network service and the predicted access level.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 9 illustrates one example of a high level logic flowchart of a process and computer program for selecting and scheduling optimized times and locations for charging battery enabled devices based on power usage impact data received from multiple sources;

FIG. 10 illustrates one example of a high level logic flowchart of a process and computer program for updating a user schedule with one or more events for the one or more optimum times and locations recommended by a power service for charging one or more battery enabled devices;

FIG. 11 illustrates one example of a high level logic flowchart of a process and computer program for monitoring individual monitored by a power service for charging one or more battery enabled devices;

FIG. 12 illustrates one example of a high level logic flowchart of a process and computer program for updating charging events to reflect actual usage of a battery enabled device during an event period.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
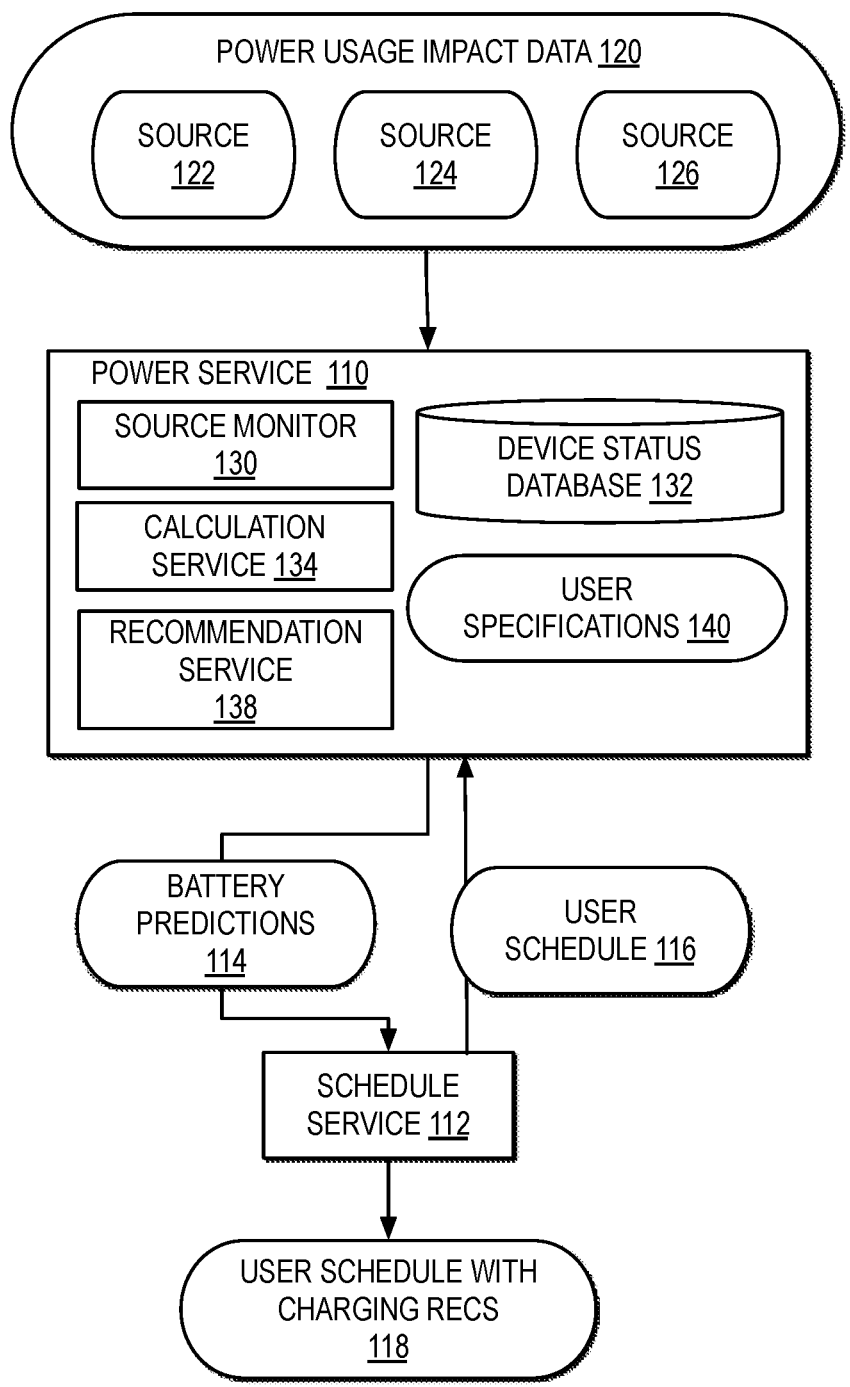
FIG. 1 illustrates one example of block diagram of a power service for selecting and scheduling optimized times and locations for charging battery enabled devices based on power usage impact data received from multiple sources.

FIG. 1 illustrates a block diagram of one example of a power service for selecting and scheduling optimized times and locations for charging battery enabled devices based on power usage impact data received from multiple sources.

In one example, a user may have access to one or more computing devices that are coupled with a battery as a power source and are enabled to run off the power of the battery, for the life of the battery per charge, also referred to as a battery enabled device. Many battery enabled devices include a battery that is a rechargeable battery, which is recharged by applying electric current to the rechargeable battery. A battery enabled device may also include a primary battery that is discarded after a single use, and may be replaced. In one example, a battery enabled device may also run directly off the power from a power outlet, when plugged in, or the battery enabled device may run off the power from a rechargeable battery, as the rechargeable battery is recharging off the power from a power outlet.

Battery enabled devices may include the additional flexibility of being portable, since the battery enabled device may draw power from a battery source coupled to the battery enabled device, and therefore battery enabled devices may be used for a period of time without being plugged into a power outlet. In one example, a power outlet may refer to one or more types of power sources that provide electronic current and are external to a battery coupled within a battery enabled device including, but not limited to, AC power plugs and sockets, wired charging stations, inductive or wireless charging stations, and battery rechargers, such as a Universal Serial Bus (USB)-based charger, a power bank, or a solar charger.

Different types of battery enabled devices may have batteries with different capacities and different discharge rates. In one example, a capacity of a battery may refer to the amount of electric charge the battery is enabled to deliver at a particular voltage and a discharge rate may refer to the rate at which a battery discharges the electric charge. A battery with a smaller cell may have less capacity than a battery with a larger cell, however, the smaller cell may weight less than the larger cell. In one example, battery enabled devices that are portable may have components that are minimized in size, to reduce the weight of the battery enabled device, and increase the portability of the battery enabled device, which may result in a battery with lower capacity. As portability increases, users may be more likely to take battery enabled devices into environments where, as the user is working, the environment promotes creativity or productivity or as the user is working, the user is riding in a vehicle or other for of transportation. In addition, as portability increases, with decreased weights, a user may select to carry multiple battery enabled devices throughout the day, planning to use some devices throughout the duration of the day and other devices at specific times throughout the day.

Some environments, while promoting creativity or productivity, or providing a user with transportation, may not have a power outlet available for recharging a battery enabled device or for powering the battery enabled device. In addition, even when the user is in an environment with a power outlet, the user may not have time to stop and charge the battery enabled device at the power outlet, and fully charge the battery, before needing to move on to another area without a power outlet. Thus, as users integrate more portable, battery enabled devices into their daily lives, but may also use the devices in locations that do not have power outlets, the user may be faced with a new daily issue of locating power outlets for recharging battery enabled devices and identifying time in the user's schedule for recharging battery enabled devices. While the rechargeable battery within a battery enabled device could be increased in size to provide additional capacity, and therefore provide longer battery life, larger capacity batteries may also add weight, and users may prefer the flexibility of a lighter battery enabled device over more capacity requiring a larger, heavier battery.

While each battery may have a capacity, or battery life, and an estimated amount of time required to recharge, these estimates may be initially estimated for a selection of ideal operating conditions. In practice, battery enabled devices may not function under ideal operating conditions and in an ideal environment. It may be difficult for a user to predict when a battery enabled device will be discharged, and need to be recharged, during the day. A user may start a day with a battery enabled device that is expected to discharge over 6 hours, under ideal operating conditions, but based on the actual operating conditions, the battery may be fully discharged within 2 hours. In one example, the capacity of a rechargeable battery device may decrease and the rate of discharge may increase if the battery is operated in environments with high temperatures or extremely low temperatures, which may impact the electrode material contained in a battery cell, diminishing the capacity of the battery and effectively increasing the discharge rate. In addition, a rechargeable battery may have a limited lifetime, where after an estimated number of recharges and discharges, the estimated capacity of the battery starts to decline with each recharge, such that over a period of time of daily use of a battery enabled device, such as a year, even when the battery is fully recharged and operating under ideal conditions, the actual capacity of the battery is reduced from the initial, starting capacity and the discharge rate increased.

In one example, under ideal operating conditions, the only applications that may run on a battery enabled device are applications that are designed according to guidance and rules that makes the application run in a more energy efficient manner, allowing the actual discharge rate to reflect the expected discharge rate. Not every vendor who designs an application, however, may program the application according to the guidance and rules required to run in an energy efficient manner. As a result, applications that are not designed according to energy efficiency guidance and rules may use more power than an application should use under ideal conditions and cause a battery to discharge more quickly than expected. While applications that are designed for energy efficiency may provide a predictable discharge under ideal operating conditions, and minimize power use, users may need or want the flexibility to use applications from vendors who do not design for application energy efficiency, which may cause a battery to drain more quickly and for the actual battery time available to decrease more quickly than estimated. In addition, even applications that are designed according to energy efficiency guidance may use additional power depending on the operating environment.

In one example, to compensate for actual operating conditions that are not ideal, the operating system of a battery enabled device may provide a low power feature, to manage the battery operating conditions, where in low power mode, the operating system may automatically shut off or stop running selected parts to reduce power consumption, such as dimming displays, shutting off a wireless network feature, turning off a hard drive, and shutting down non-critical applications. While providing power saving features through a low power mode may control a battery enabled device to operate closer to ideal operating conditions, or prolong a remaining portion of battery life, shutting down features of the battery enabled device may also negatively impact the creativity or productivity of the user working with the battery enabled device.

While an individual battery enabled device may include battery monitoring applications and operating system features that monitor actual use of a battery and adjust an amount of predicted battery life output in a user display, if the user needs battery enabled devices to be available at certain times and locations throughout a day, the user may spend a significant amount of time watching the changes to the predicted battery life and also identifying power outlet locations available for charging devices based on the real-time operating conditions of each battery enabled device. Given that actual battery life may vary from day to day, depending on factors that impact capacity and discharge rates, if a user will not have time or access to stop and charge a battery enabled device at a power outlet at a fixed location, the user may carry along a portable power outlet, such as a battery recharger, to provide a more reliable power source in the field. Battery rechargers, however, add additional weight to what a user is carrying, require additional space, add an additional cost to purchase the battery recharger, and only hold a limited amount of electric current for recharging battery enabled devices. There are environments where the additional weight and space of a battery recharger is burdensome on the user. In addition, some battery rechargers, such as a USB-based recharger, may need to be recharged to be used as a power source, which requires the user to find time for recharging both a battery recharger and a battery enabled device. Further, some battery rechargers, such as a solar charger, may only function in areas where the solar cell can charge.

In one example, to automate the selection and scheduling of optimum times and locations for recharging battery enabled devices for a user, a power service 110 may include a source monitor 130 that monitors for power usage impact data 120 for the one or more battery enabled devices accessible to a particular user or group of users, where power usage impact data 120 may reflect the actual operating conditions of multiple battery enabled devices and conditions that may impact the future operating conditions of multiple battery enabled devices. Power usage impact data 120 may include data impacting the availability, usage, capacity, and performance of each battery within each battery enabled device. Power usage impact data 120 enables power service 110 to keep track of power consumption and battery levels for each battery enabled device available to a particular user. In one example, source monitor 130 may store power usage impact data 120 in a device status database 132 according to one or more identifiers, such as, but not limited to, a user identifier, a device identifier, and a device type identifier.

In one example, power usage impact data 120 may include data pushed or pulled from multiple sources, such as a source 122, a source 124, and a source 126. In one example, each of source 122, source 124, and source 126 may represent one or more types of sources including, but not limited to, a user's one or more battery enabled devices, manufacturer device specification sources, weather services, mapping services, GPS or location detection services, Wi-Fi service providers, cellular service providers, data from a user interface, data from other users' battery enabled devices, data collected by schedule service 112 into a database of historical scheduling information, and other data sources. For example, source 122 may represent a battery enabled device that provides a location of the battery enabled device, source 124 may represent a charging locations database that provides charging location information by location, and source 126 may include a temperature service, providing the temperature conditions at the location, where the air temperature at the location of the battery enabled device may impact the performance of the battery.

In one example, source monitor 130 may identify source 122, source 124, and source 126 based on one or more sources specified in user specifications 140 for a particular user. In one example, source monitor 130 may push power usage data requests to or select sources to receive power usage impact data from the sources specified in user specifications 140. For example, in user specifications 140, a user may specify one or more battery enabled devices as sources and may specify one or more services as sources. Each of the battery enabled devices and other sources may provide a client application that monitors and analyzes data and communicates with power service 110.

In addition, power service 110 may also access a user schedule 116 from a schedule service 112 and store user schedule 116 in device status database 132. In one example, user schedule 116 may include one or more events scheduled for a user. In one example, each event in user scheduler 116 may include one or more types of general data, including, but not limited to, an event label and a time. In addition, each event in user scheduler 116 may include additional types of data including, but not limited to, a priority of the event, a location of the event, and invitees to the event. In addition, user schedule 116 may include information that is embedded in a user's schedule, such as, but not limited to, weather forecasts, holidays, game dates and times, travel itineraries detected from electronic mail with travel confirmation, events from third party online event scheduling services, and other event information gathered from another calendar provider, data service provider, electronic mail application, or event service provider.

Source monitor 130 may select which schedule services to push schedule requests and battery predictions to or may select which schedule services to receive user schedules from and send battery predicts to. For example, in user specifications 140, a user may specify one or more scheduling services for power service 110 to connect with to update user schedule with charging recs 118. In another example, a user may specify preferences applied by schedule service 112, for schedule service 112 to interact with power service 110. In one example, schedule service 112 may represent a server that acts as a hub for a scheduling service for one or more users, which interacts with client application running on one or more battery enabled devices. In one example, a user may receive user schedule 116 at a user interface of a client scheduling application on a battery enabled device and may adjust user schedule 116 within the user interface, where changes to user schedule 116 within the user interface are pushed back to scheduling service 112.

In addition, one or more events in user schedule 116 may include information that expressly indicates periods of time when the user may need to use one or more battery enabled devices, indicates whether there will be a power outlet accessible during the periods of time or whether battery power will be required, indicates the expected locations of the user throughout a day, and indicates other scheduling information regarding the user's anticipated use of the one or more battery enabled devices over a span of time. In addition, one or more events in user schedule 116 may include information that provides context from which a calculation service 134 of power service 110, based on user schedule 116 and power usage impact data 120, may predict the locations of the user over a span of time, predict when a user will likely use the one or more battery enabled devices, and predict when a user will have windows of time available to recharge battery enabled devices at a power outlet. For example, user schedule 116 may include an event indicating when a user will be traveling and the type of transportation, which may provide context from which calculation service 134 can predict whether the type of travel will place the user at risk for not being able to charge battery enabled devices during the event. In another example, user schedule 116 may include events indicated as meetings, which may provide context from which calculation service 134 can predict which battery enabled devices the user will require during the meetings and the type of uses of the battery enabled devices. In addition, over time, device status database 132 may track how a user normally uses each battery enabled device and calculation service 134 may predict, within user schedule 116 for a current day, how a user will use each battery enabled device for normal operation during the current day, based on how the user historically uses each battery enabled device on a normal day as tracked in device status database 132.

In one example, calculation service 134 of power service 110 may analyze power usage impact data 120 collected over one or more time periods in device status database 132, including user schedule 116, to predict optimum times and locations to recharge each battery enabled device to maintain charge in battery enabled devices required by the user when a user may not have access to a power outlet and to minimize disruption for recharging battery enabled devices. Calculation service 134 may predict optimum times and locations based on one or more criteria including, but not limited to, minimizing time to recharge, optimizing battery life, minimizing a number of trips to recharge battery enabled devices, prioritization of when and where a user needs to use battery enabled devices, optimizing use of network availability, optimizing use of charging availability, optimizing use of battery enabled devices based on historical usage, and preventing drained battery conditions. Calculation service 134 may identify and provide recommended recharge times and locations for each battery enabled device or for a group of battery enabled devices. A recommendation service 138 of power service 110 may output the recommended recharging times and locations to schedule service 112 as battery predictions 114. In particular, recommendation service 138 may specify the format of battery predictions 114 and select schedule service 112 based on user selections of format preferences and schedule service preferences in user specifications 140.

In one example, schedule service 112 may receive battery predictions 114, update user schedule 116 with the recommended recharging times and locations in battery predictions 114 and output the updated schedule as user schedule with charging recs 118. In particular, in one example, schedule service 112 may receive battery predictions 114 with one or more recommended recharging times and locations each specified as a separate event within a calendar output that may be embedded into or overlaid into user schedule 116. In another example, schedule service 112 may receive battery predictions 114 with a compilation of each of the one or more recommended recharging times and locations specified as a separate event. In additional or alternate examples, battery predictions 114 may be output in additional or alternate formats.

In particular, in one example, by providing a user with user schedule with charging recs 118, schedule service 112 may integrate battery predictions 114 with an output of user schedule 116 that overlays battery predictions 114 into the scheduling interface already accessed by a user, such that the user may focus on creativity and productivity when using a battery enabled device and rely on user schedule with charging recs 118 to prompt the user with times and locations to recharge battery enabled devices to optimize use of the battery enabled devices, such that the user may have battery enabled devices powered and available during times when the user needs to use the devices.

In particular, in one example, power service 110 may analyze power usage impact data 120 and user schedule 116 to identify the actual, current operating conditions of multiple battery enabled devices, receive predicted usage for the multiple battery enabled devices based on user schedule 116, analyze the current operating conditions and predicted usage to identify one or more recommended recharging times and locations for each of the multiple battery enabled devices, and provide the recommended recharging times and locations as battery predictions 114. User schedule with charging recs 118, as updated by battery predictions 114, may provide the user with scheduled events of recommended recharging times and locations based on current operating conditions and predicted usage of the battery enabled devices, such that the user may anticipate and plan when and where to recharge the battery of a battery enabled device based on real-time current operating conditions and based on the predicted need for use of the battery enabled devices. Power service 110 may continue to monitor current operating conditions for one or more battery enabled devices, in real-time, from power usage impact data 120 and dynamically adjust battery predictions 114, to update user schedule with charging recs 118, if the current usage increases or decreases from the predicted usage or the user's scheduled access to a power outlet changes, and a window for recharging the device is recommended to be sooner or later than initially scheduled.

In particular, in one example, calculation service 134 may analyze power usage impact data 120 and user schedule 116 to determine one or more optimum times including, but not limited to, the time each battery enabled device is likely to run out of power, the optimum time to coordinate recharging of different devices to minimize the number of power outlets that need to be located during a day and the amount of time spent recharging at the power outlets, the optimum time to recharge each battery enabled device based on user activity, the optimum time to recharge each battery enabled device the fastest, and the optimum time to recharge based on scheduled events.

In one example, in selecting optimum times and locations, calculation service 134 may identify that a user is in the field taking measurements with a specific battery enabled device, but the user has multiple meetings to attend during the day during which the user will need to use the battery enabled device, therefore calculation service 134 may predict when the battery will need to be recharged, identify any breaks between meetings, which may allow for even short periods of recharging, and recommend that the user recharge the battery enabled device during the breaks. If the user does not have any breaks, calculation service 134 may identify the next best times and locations for the user to recharge the battery enabled device and may recommend that the user carry a battery recharger, that is charged, to recharge the battery enabled device, to ensure that the user has the battery enabled device available for use during all meetings planned for the day.

In another example, in selecting optimum times and locations, calculation service 134 may analyze the status of four battery enabled devices that a user carries, where each device battery may have a different capacity and may be running at different battery levels, where calculation service 134 determine the optimum time and location to concurrently charge all four battery enabled devices to fully charge all four devices at one time, to minimize the number of times that a user may need to stop during the day to charge the four devices. Calculation service 134 may also predict or detect that additional battery charging accessories may be required for the user to recharge all four devices at one time at a particular power outlet. Recommendation service 138 may include the one or more optimum times in battery predictions 114, along with predicted or detected battery charging accessories requirements.

In one example, power usage impact data 120 may also include other user schedules, from one or more sources, or power service 110 may receive other user schedules from schedule service 112. User specifications 140 may specify a group of users where battery enabled devices or scheduling of use of battery enabled devices may be shared across the group of users. For example, calculation service 134 may detect that within a group of users, the battery enabled device carried by one particular user in the group cannot be recharged and will not be available for use during a particular time of day or a particular scheduled task, but that another battery enabled device carried by another user in the group is available for use during the particular time of day or the particular scheduled task and update battery predictions 114 for the particular user to indicate that the other user's battery enabled device should be used, and may also recommend rescheduling the particular task to be performed by the other user, if only a single user needs to be assigned per task. In another example, calculation service 134 may detect the battery health predictions of multiple battery enabled devices in a group of users and prioritize which battery enabled devices should be used in the group and which battery enabled devices should be charged first in the group, if charging options are limited.

In particular, in one example, calculation service 134 may analyze power usage impact data 120 and user schedule 116 to receive the predicted usage and locations of usage for multiple battery enabled devices, access one or more battery usage impact factors for the locations that impact both battery usage and performance, such as temperature, access to wireless networks, cellular network strength and bandwidth, and accessibility to charging areas, and analyze the predicted usage and locations of usage and the one or more battery usage impact factors to predict recommended recharging times for the multiple battery enabled devices. User schedule with charging recs 118, as updated by battery predictions 114, may provide the user with scheduled events of recommended recharging times and locations based on predicted usage locations and factors that may impact the operating conditions and performance at the predicted locations, such that the user may anticipate and plan when and where to recharge battery enabled batteries based on predicted schedule locations and factors that may impact the availability and performance of the battery at the locations.

Source monitor 130 may continue to monitor the predicted usage information and locations, to determine whether the user changes to other locations, and may continue to receive updated battery usage impact factors for locations, such as changes to the temperature at a location. Calculation service 134 may dynamically adjust recommended times and locations for recharging battery enabled devices based on real-time changes to predicted conditions. Recommendation service 138 may dynamically update battery predictions 114 with adjusted recommendations, such that schedule service 112 may update user schedule with charging recs 118, if the changes to locations or battery usage impact factors shifts the window for charging the device sooner or later than initially scheduled. In one example, as recommendation service 118 updates battery predictions 114, recommendation service 138 may push updates to battery predictions 114 directly to a battery enabled device to be output as alerts to the user at the battery enabled device. In another example, as recommendation service 118 updates battery predictions 114, schedule service 112 may update user scheduling with charging recs 118 according to updated battery predictions and provide alerts or graphical indictors to the user at the battery enabled device indicating changes to recharging events within user scheduling with charging recs 118.

In one example, while in the example illustrated power service 110 may interact with one or more scheduling services, such as schedule service 112, in additional or alternate examples, power service 110 may be integrated within schedule service 112. In addition, in additional or alternate examples, schedule service 112 may interact with different power services, where each registered user of schedule service 112 may select which power service to subscribe to.

Figure 2:
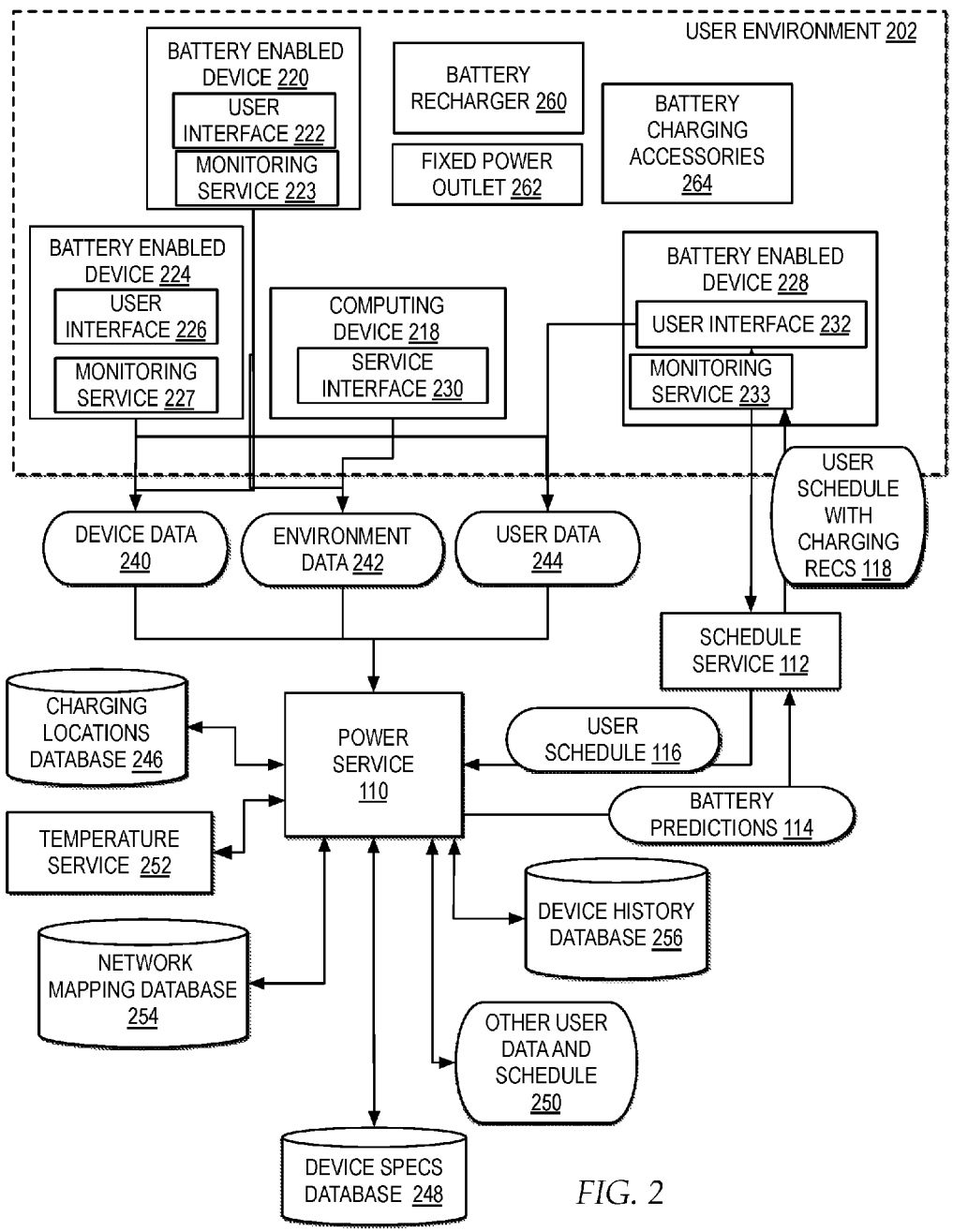
FIG. 2 illustrates one example of a block diagram of a power service for optimizing a schedule of scheduled times and locations to charge battery enabled devices based on power usage impact data received from multiple sources within a user environment.

FIG. 2 illustrates a block diagram of one example a power service for optimizing a schedule of scheduled times and locations to charge battery enabled devices based on power usage impact data received from multiple sources within a user environment.

In one example, a user environment 202 may represent an environment in which a user is located, or an environment that a user is predicted to be located within. User environment 202 may include the one or more elements available to the user within user environment 202 including, but not limited to, one or more devices, such as a battery enabled device 220, a battery enabled device 224, a battery enabled device 228, and a computing device 218, one or more user interfaces, such as a user interface 222, a user interface 226, a user interface 232, and a service interface 240, one or more charging options, such as a battery recharger 260 and a fixed power outlet 262, and one or more battery charging accessories, such as battery charging accessories 264. In one example, one or more components within user environment 202 may change at different times based on the physical locations of a user and the physical locations of one or more of the components. User environment 202 may include additional or alternate devices, user interfaces, power outlets, portable chargers, and charging accessories.

In one example, battery enabled device 220, battery enabled device 224, and battery enabled device 228 may each represent a separate battery enabled device accessible to the user, each including one or more batteries that may be recharged and provide the power source for the battery enabled device for a period of time. Each battery within each of the battery enabled devices may have an initial, starting capacity and an estimated battery life, based on ideal operating conditions. In reality, battery enabled devices may not operate under these ideal operating conditions, therefore the actual battery life, per recharge of a battery, may vary dependent upon how a user is interacting with a battery enabled device, environmental factors impacting user environment 202, and other factors.

In one example, each battery enabled device may support a user interface, through which a user in user environment 202 may interact with the battery enabled device, such as by interacting with interfaces of applications running on each battery enabled device. For example, battery enabled device 220 supports user interface 222, battery enabled device 224 supports user interface 226, and battery enabled device 228 supports user interface 232. In additional or alternate embodiments, user environment 202 may include additional or alternate battery enabled devices. The types of applications open within each user interface, the graphics and network requirements of the applications, and the frequency at which the user interacts with the applications may impact the amount of power required from a battery for powering the user interface within a time window.

Each of battery enabled device 220, battery enabled device 224, and battery enabled device 228 may include one or more operating system or application services that monitor and analyze battery metrics and device use, illustrated as monitoring service 225, monitoring service 227, and monitoring service 233, respectively. In one example, the battery metrics monitored and analyzed may include, but are not limited to, the health of the device indicating an estimated battery life, current usage of the device by one or more units such as low, high or idle or by application type, historical usage by time or day, week or other time unit, and a device location. Each of monitoring service 225, monitoring service 227, and monitoring service 233 may also generate, based on the monitored metrics, a predicted battery life remaining in the battery metrics.

In one example, power service 110 may receive power usage impact data 120 including device data 240 from one or more sources. In one example, each of monitoring service 225, monitoring service 227, and monitoring service 233 may be registered as sources that report battery metrics to power service 110 as device data 240, including an identifier of the battery enabled device.

In one example, power service 110 may receive power usage impact data 120 including environment data 242 from one or more sources. In one example, each of monitoring service 225, monitoring service 227, and monitoring service 233 may also monitor for one or more environmental aspects of user environment 202 that impact battery performance within the environment and report the one or more environmental aspects to power service 110 as environment data 242. In one example, environmental data may include, but is not limited to, location based information, such as temperature, access to a wireless network and speed of the network, access to cellular service and level of available cellular service, and availability of charging areas. In one example, the temperature of user environment 202 may reduce the expected battery life of batteries used within user environment 202 because batteries are generally designed for optimized operation within a range of temperatures, where the temperature exceeds the range or drops below the range, the battery capacity may be impacted and the battery may discharge more quickly than when operating within the range of temperatures. In one example, the access to a wireless network and speed of the wireless network may impact the expected battery life of batteries used within user environment 202 because a slower network may return data more slowly and deplete the battery more quickly than when operating on a faster network that returns data more quickly. In one example, the access to cellular service and level of available cellular service may reduce the expected battery life of batteries used within user environment 202 because if wireless service is not available and cellular service is required for network access, cellular service based access may require more power than wireless service based access and if the cellar service level is low or not available, the device may use additional power attempting to ping cellular towers and find available cellular service.

In one example, monitoring service 225, monitoring service 227, and monitoring service 233 may detect environment data about user environment 202. In another example, one or more of the monitoring services, such as monitoring service 233, may access schedule service 112, and receive user schedule with charging recs 118. Monitoring service 233 may detect predicted locations in future user environments and interface with one or more services to access predicted weather conditions, predicted access to Wi-Fi and cellular service, and predicted access to power outlets within future user environments. Monitoring service 233 may send environment data 242 including current environmental conditions for user environment 202 and predicted environmental conditions for future environments based on scheduled events in user schedule with charging recs 118.

In one example, computing device 218, which is not included in the battery enabled devices accessible to the user, may represent a computing device that is present within user environment 202 and may provide one or more services that collect environmental data within user environment 202, along with a service interface 230 through which a user may interact with computing device 218. Computing device 218 may represent a source that reports environmental data 242 to power service 110. For example, computing device 218 may include, but is not limited to, a server, a security system device, a network device, a power source registration system, and other systems that a user may interact with or that may detect a user's presence within user environment 202. For example, computing device 218 may include a service interface 230 that passively detects information about the temperature of user environment 202, the type of network service available within user environment 202, the availability of portable charger 260 and fixed power source 262, or other information about user environment 202 that may impact battery health and availability.

In one example, user environment 202 may include battery recharger 260, which is a portable power outlet the user has carried into user environment 202. In one example, battery recharger 260 may include a function that monitors the amount of power remaining in battery recharger 260 and broadcasts or transmits the amount of power remaining through a wired or wireless connection. In one example, battery enabled device 220, battery enabled device 224, battery enabled device 228, or computing device 218 may detect a wireless broadcast of the amount of power from battery recharger 260 or may detect the presence of battery recharger 260 from detecting a wireless broadcast or reading an RFID affixed to battery recharger 260. In another example, battery enabled device 220, battery enabled device 224 or battery enabled device 228 may detect the amount of power remaining in battery recharger 260 when battery recharger 260 is connected to one of the devices, recharging the battery on the device. In another example, a user may, through user interface 222, user interface 226, user interface 232, or service interface 230, enter a status of battery recharger 260, indicating the user is carrying battery recharger 260 and indicating whether battery recharger 260 has been fully recharged. In one example, battery enabled device 220, battery enabled device 224, and battery enabled device 228 may pass information monitored about battery recharger 260 to power service 110 as environment data 242.

In one example, user environment 202 may include fixed power outlet 262, which is a temporary or permanent power outlet with a fixed location within user environment 202. In one example, fixed power outlet 262 may include an RFID affixed to fixed power outlet 262 that actively or passively broadcasts location and availability information about fixed power outlet 262. In one example, battery enabled device 220, battery enabled device 224, battery enabled device 228 or computing device 218 may read the broadcast information about fixed power outlet 262 and identify that fixed power outlet 262 is present in user environment 202. In another example, a user may, through user interface 222, user interface 226, user interface 232, or service interface 230, identify that fixed power outlet 262 is present in user environment 202 and provide additional information about fixed power outlet 262 such as, but not limited to, a location, type of power outlet, a number of sockets, and information about any battery charging accessories included at fixed power outlet 262. In one example, battery enabled device 220, battery enabled device 224, and battery enabled device 228 may pass information monitored about fixed power outlet 262 to power service 110 as environment data 242.

In one example, user environment 202 may include battery charging accessories 264, which may represent cords, socket adapters, socket splitters, and other hardware that enable one or more battery enabled devices to connect to battery recharger 260 and fixed power outlet 262 within user environment 202. In one example, each battery charging accessory may include an RFID affixed to it that actively or passively broadcasts location and availability information about battery charging accessories 264. In one example, battery enabled device 220, battery enabled device 224, battery enabled device 228 or computing device 218 may read the broadcast information about battery charging accessories 264 and identify that battery charging accessories 264 are present in user environment 202. In another example, a user may, through user interface 222, user interface 226, user interface 232, or service interface 230, identify that battery charging accessories 264 are present in user environment 202 and provide additional information about battery charging accessories 264 such as, but not limited to a cord type, cord length, type of socket adapter, and number of sockets available on a socket splitter. In one example, battery enabled device 220, battery enabled device 224, and battery enabled device 228 may pass information monitored about battery charging accessories 264 to power service 110 as environment data 242.

In one example, power service 110 may access power impact usage data 120 including charging locations from a charging locations database 246. In one example, charging locations database 246 may include identifiers for one or more fixed power outlets by location. In one example, a service provider may directly interact with charging locations database 246 to update identifiers of fixed power outlets in charging locations database 246. In another example, as power service 110 receives environment data 242 indicating the presence of fixed power outlet in user environment 202, power service 110 may also update charging locations database 246 with the location and other specifications provided regarding fixed power outlet 262. In one example, charging locations database 246 may include locations that are secured, and require that power service 110 present a user credential with a particular level of authentication to access charging locations from charging locations database 246 for a particular location.

In one example, power service 110 may access power impact usage data 120 including user data 244 from one or more sources. In one example, one or more of monitoring service 223, monitoring service 227, and monitoring service 233 may also detect information that is locally detectable about a user at a particular battery enabled device, which may impact the present or future operating conditions of battery enabled devices and may also impact the operating conditions within a present or future user environment and report the information as user data 244. In one example, user data 244 may include indicators of whether user environment 202 is a normal, frequently visited environment or a new, unfamiliar environment for a particular user, based on previous locations detected by monitoring services, previous scheduling info, or indicators within the current schedule. User data 244 may specify a risk factor for the environment indicative of the need for the user to have reliable access to powered up battery enabled devices. In addition, a monitoring service with access to a user's schedule, such as monitoring service 233, may evaluate and report in user data 244 aspects of user data that are locally detectable such as, but not limited to, the relative number of meetings scheduled for that day during which a user requires use of a battery enabled device and how the user typically uses the battery enabled device when the user's schedule does not indicate any event is schedule. In addition, user data 244 may include a location of the battery enabled device, detected by monitoring service 223, monitoring service 227, or monitoring service 233, with an evaluation of how a user typically uses the battery enabled device when the user is at the location.

In one example, power service 110 may access power impact usage data 120 including current or predicted temperature forecasts for a particular location from a temperature service 252. In one example, power service 110 may receive a current location of a battery enabled device or detect a predicted location of a battery enabled device based on user schedule 116, and query temperature service 252 to provide real-time updates for the weather for the current location or predicted location. In one example, temperature service 252 may detect whether a location is an indoor location or an outdoor location, or possibly an indoor or outdoor location, depending on a user's elevation. For outdoor locations, temperature service 252 may access a current weather report or predicted weather forecast for the location from one or more weather services. For indoor locations, temperature service 252 may predict an indoor temperature based on temperature information reported by a building or based on previously record temperature data. For example, as power service 110 receives environment data 242, environment data 242 may indicate a detected temperature within an indoor user environment and power service 110 may send the location and detected temperature to temperature service 252 to monitor expected indoor temperatures at a particular location.

In one example, power service 110 may access power impact usage data 120 including current or predicted network availability for a particular location from a network mapping database 254. In one example, network availability may include Wi-Fi availability and cellular availability, along with indicating network strengths and provider requirements. In one example, Wi-Fi providers and cellular providers may provide network availability mapping that is loaded into network mapping database 254. In another example, as power service 110 receives environment data 242 indicating network availability within user environment 202, power service 110 may update network mapping database 254 with the locations of network availability reported in environment data 242. By updating network mapping database 254 with real-time data from environment data 242, if the network availability at a location does not match the network availability indicated by a Wi-Fi provider or cellular provider, as users at the location report the change in network availability, network mapping database 254 may reflect real-time network availability and power service 110 may update battery predictions 114 to reflect changes to battery life predicted based on changes to real-time network availability in a particular location for multiple users of power service 110.

In one example, power service 110 may access power impact usage data 120 including manufacturer specifications for a battery enabled device and to access reviews of a battery enabled device from a device specs database 248. In one example, manufacturer specifications available from device specs database 248 may include, but are not limited to, ideal operating conditions, predicted device power consumption, predicted battery life information, and additional specifications about a battery enabled device that a manufacturer may provide. In addition, in one example, manufacturer specifications available from device specs database 248 may include, but are not limited to, industry test results and evaluations and consumer evaluations of the operation of battery enabled devices.

In one example, power service 110 may access power usage impact data 120 including other user data and schedules 250 from battery enabled devices for other users and from schedule service 112 or other schedule services. In one example, by accessing other user data and schedules 250, power service 110 may determine whether there are multiple battery enabled devices currently available or scheduled to be accessible to a group of users at a particular location and may prioritize the use of fixed power outlets within a particular location, or recommend additional battery charging accessories to support charging additional battery enabled devices at a particular location.

In another example, by accessing other user data and schedules 250, power service may determine, for an event in user schedule 116 that requires a user to provide a service from among a group of users, whether other users may have a battery enabled device with more power available to provide the service during the event. For example, if an event in user schedule 116 is for a service call that requires use of a battery enabled device, with multiple technicians in a group assigned to the event, power service 110 may predict which technician in the group will have a battery enabled device that is adequately charged to provide service during the event. In another example, power service 110 may also provide information from user data and schedules 250 to charging locations database 246, temperature services 252, network mapping database 254, device specs database 248, and a device history database 256.

In one example, power service 110 may access a device history database 256 as power usage impact data 120. In one example, device history database 256 may include records of device data 240, environment data 242, user data 244, user schedule 116, other user data and schedule 250, and battery predictions 114 for one or more users for one or more periods of time. In one example, power service 110 may store records for a particular user from device status database 132 into a larger database of information collected for multiple users, across multiple devices, locations, and periods of time. In one example, calculation service 134 of power service 110 may periodically filter and analyze records in device history database 256 to calculate predictions of current and future use of battery enabled devices according to the type of device, location, time of day, type of event, applications used, and other factors that may impact the use of battery enabled devices. Calculation service 134 may filter and analyze records in device history database 256 for a particular user, a selection of users in a group or groups, or for all users. For example, device history database 256 may filter records in device history database 256 for a particular location and detect that an application most commonly used at the particular location is an augmented virtual reality application, which consumes power at a higher rate than most applications because of the need for constant network access and the use of processing power for virtual reality images. In another example, device history database 256 may filter records in device history database 256 for a particular location and detect a percentage of users who are at the location and use a fixed power outlet at the location or detect a percentage of users who are at a location that does not have a fixed power outlet, but use a battery recharger while at the location. In another example, device history database 256 may filter records in device history database 256 for a particular location and detect times of day, days of the week, seasons of the year, or specific events when there are a large number of users at the location, which may impact network availability. In another example, device history database 256 may further filter records in device history database 256 for a particular location for a particular group of users and detect the types of events scheduled for the particular group of users that require each user in the group of users to have access to multiple battery enabled devices throughout the event. In one example, device history database 256 may also include an analysis function that periodically analyzes the records in device history database 256 according to particular rules and calculates statistics regarding particular locations that power service 110 applies to determine whether to update battery predictions 114 based on real-time changes to the conditions of an environment included in user schedule 116.

In one example, source monitor 130 may monitor power usage impact data 120 including data from device data 240, environment data 242, user data 244, charging locations database 246, temperature service 252, network mapping database 254, device specs database 248, other user data and schedule 250, device history database 256, and user schedule 116. Calculation service 134 may analyze power usage impact data 120, along with data in device status database 132, and predict the times when the user will require use of each of battery enabled device 220, battery enabled device 224, and battery enabled device 228, identify and predict battery life impact factors, such as usage and environment to estimate a battery life of each of battery enabled device 220, battery enabled device 224, and battery enabled device 228 throughout a day, predict when each of battery enabled device 220, battery enabled device 224, and battery enabled device 228 will require recharging, and identify one or more locations where recharging is available to a user. Based on the analysis, predictions, and identifications by calculation service 134, calculation service 134 may select and schedule optimum times and locations for recharging each of battery enabled device 220, battery enabled device 224, and battery enabled device 228 that will ensure that each device is available when needed by the user, minimize the amount of times required for recharging devices throughout the day, and mitigate times when a device may be drained or charging, and not available. Power service 110 may output the optimum times and locations in battery predictions 114, output to schedule service 112, for output to a user within an interface for accessing user schedule with charging recs 118, such as user interface 232 of battery enabled device 228.

In one example, when selecting and scheduling optimum times and locations for recharging each of battery enabled device 220, battery enabled device 224, and battery enabled device 228, calculations service 134 may detect whether the optimum times and locations require a user to carry additional hardware with the user, such as a battery recharger 260 and battery charging accessories 264. Recommendation service 138, when generating the recharging event recommendations in battery predictions 114, may specify whether a specific fixed power outlet is identified for use, whether an area is known to include fixed power outlets that a user may use, or whether the user will need to carry a charged battery recharger. In addition, recommendation service 138, when generating the recharging event recommendations in battery predictions 114, may specify one or more battery charging accessories that a user may need to be carrying during specific times of the day.

In addition, when selecting and scheduling optimum times and locations for recharging each battery enabled device carried by a user, calculation service 134 may first detect, from a selection of registered battery enabled devices in user specifications 140, based on the events of the day, which battery enabled devices a user needs to be carrying with them at different points throughout the day. Recommendation service 138, when generating the recharging event recommendations in battery predictions 114 may include a packing event that lists the specific battery enabled devices and any battery rechargers and battery charging accessories the user will require for a particular day, that prompts the user to pack a selection of battery enabled devices and hardware for the day, or at specific points during the day, depending on the user's schedule, so that the user will have the necessary battery enabled devices and any battery rechargers and battery charging accessories required for upcoming events. In one example, recommendation service 138 may also generate a sleep time recharging event that specific battery enabled devices and any battery rechargers need to be charging while a user is sleeping, so that the battery enabled devices are fully recharged and ready to be packed as part of the packing event.

Figure 3:
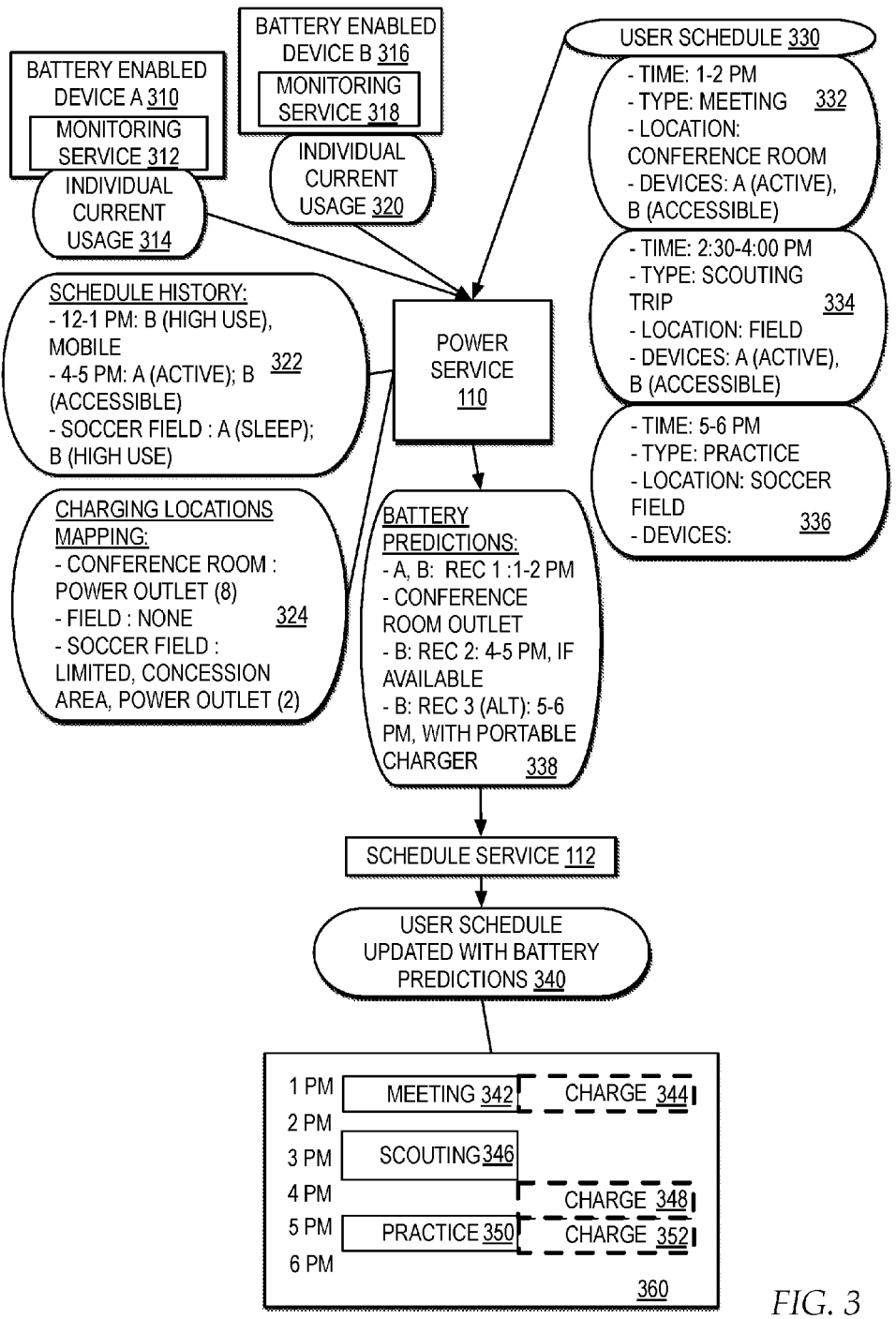
FIG. 3 illustrates one example of a block diagram of a power service for optimizing a schedule of scheduled times and locations to charge battery enabled devices based on individual usage data received from multiple battery enabled devices and a schedule of predicted usage of the multiple battery enabled devices.

FIG. 3 illustrates a block diagram of one example of a power service for optimizing a schedule of scheduled times and locations to charge battery enabled devices based on individual usage data received from multiple battery enabled devices and a schedule of predicted usage of the multiple battery enabled devices.

In one example, for a particular user, power service 110 receives individual current usage 314 and individual current usage 320. In one example, each of a battery enabled device A 310 and a battery enabled device B 316 may each include a monitoring service, such as a monitoring service 312 and a monitoring service 318, respectively. Monitoring service 312 may locally monitor current usage of battery enabled device A 310 and output the monitored usage as individual current usage 314. Monitoring service 318 may locally monitor current usage of battery enabled device B 316 and output the monitored usage as individual current usage 320. In one example, individual current usage 312 and individual current usage 320 may include one or more types of data including, but not limited to, device data 240, environment data 242, and user data 242. In particular, individual current usage 312 and individual current usage 320 may include data related to usage including, but not limited to, battery life, application usage, historical usage for a current time, predicted time remaining, and location.

In one example, for a particular user, power service 110 also receives a user schedule 330. In one example, user schedule 330 may include multiple events for one or more periods of time, such as an event 332, an event 334, and an event 336. In one example, event 332 includes a time range of "1-2 PM", a type of "meeting", a location of "conference room", and a predicted device requirement of "A (active)" and "B (accessible)". In one example, event 334 includes a time range of "2:30-4:00 PM", a type of "scouting trip", a location of "field", and a predicted device requirement of "A (active)" and "B (accessible)". In one example, event 336 includes a time range of "5-6 PM", a type of "practice", a location of "soccer field", and a predicted device requirement that is empty.

In one example, as calculation service 134 of power service 110 receives user schedule 330, calculation service 134 may analyze user schedule 330 to determine which portions of schedule 330 may require additional predictions to more accurately predict the optimum times and locations for charging the battery enabled devices. In particular, a user may not update user schedule 330 with every actual event that the user is participating in that day or may leave some events without full information about predicted device use. In one example, calculation service 134 may analyze user schedule 330 to identify time periods that do not include any events, such as a time period prior to event 332, and a time period of "4-5 PM" between event 334 and event 336. In one example, calculation service 134 may analyze user schedule 330 to identify characteristics of events that do not specify predicted device usage, such as a type of "practice" and a location of "soccer field" in event 336, which does not include a device usage prediction.

In one example, based on the missing predicted device usage times and events identified by calculations service 134 in user schedule 330, power service 110 may search device history database 256 and analyze the previous schedules and device use by a particular user, for the missing usage times and events, to identify schedule history 322. In one example, battery enabled device A 310 represents a portable laptop computer that a user actively uses during work hours and battery enabled device B 316 represents a portable telephone device that a user need to have accessible during work hours, but generally the user actively uses the applications on the portable telephone device during non-work hours. In one example, for a time period prior to event 332 of "12-1 PM", schedule history 322 includes a predicted use of "device B" and a predicted level of use of "high use", where the "12-1 PM" time window may represent a lunch break for the user, during which the user frequently uses applications that require higher amounts of energy. In one example, for a time period of "4-5 PM", schedule history 322 includes a predicted use of "device A" and a predicted level of use of "active" and a predicted use of "device B" and a predicted level of use of "accessible", where the "4-5 PM" time window may represent a time period that is generally part of the user's work day, but may not be specifically scheduled in user schedule 330. In one example, for a location of "soccer field", schedule history 322 includes a predicted use of "device A" and a predicted level of use of "sleep" and a predicted use of "device B" and a predicted level of use of "high use", where the "soccer field" location may represent a non-work location where the user typically leaves battery enabled device A 310 in a sleep mode and where the user frequently uses applications that require higher amounts of energy.

In one example, as illustrated each event, with the predicted device requirement, may include a level of predicted use required by device. In one example, the predicted use may indicate a predicted percentage of energy that is predicted to be used. In another example, as illustrated, the predicted use levels may include identifiers, where each identifier may correlate with a range of predicted percentage of energy use. In one example, a level of "high use" may represent a predicted level of use of one or more applications on a device that require a significantly larger percentage of energy than average applications. In one example, a level of "active" may represent a predicted, consistent use of a device for a period of time in a manner that reduces the likelihood that the device will transition into a monitoring only or sleep mode and using applications that use an average or low percentage of energy. In one example, a level of "accessible" may represent a need for a device to be on, but may be in a monitoring mode where the device periodically monitors for certain types of information and maintains a network signal, but the user is not predicted to regularly interact with the device interface. In one example, a level of "sleep" may represent a mode in which a device is not turned off, but uses a minimal percentage of energy.

In one example, calculations service 134 may search charging locations database 246 for one or more of the locations identified in user schedule 330 and predicted in schedule history 322. In one example, calculation service 134 may access charging locations 324 from charging locations database 246, including information and mapping data for the "conference room" location indicating that the power source available is 8 power outlets, for the "field" location indicating there is no power source available, and for the "soccer field" indicating there is a power source that is limited, in the concession area, with 2 power outlets.

In one example, based on individual current usage 314, individual current usage 320, user schedule 330, schedule history 322, and charging locations mapping, in addition to additional factors and data available to power service 110, calculation service 134 may generate predictions of the optimum times and locations for recharging battery enabled device A 310 and battery enabled device B 316 and recommendation service 138 of power service 110 may output the optimum times and locations as battery predictions 338. In one example, battery predictions 338 includes a first recommendation "rec 1", for both "device A" and "device B", of a time period of "1-2 PM", which recommends that as the user participates in the meeting of event 332, the user use the power outlets available to recharge "device A" and "device B". In one example, battery predictions 338 includes a second recommendation of "rec 2" for "device B" of a time period of "4-5 PM", which recommends that the user recharge "device B" during time period, as power outlets are available. In one example, battery predictions 338 includes a third recommendation of "rec 3", as an alternative, for "device B" of a time period of "5-6 PM", which recommends that the user travel with a portable charger for the "5-6 PM" time period. In one example, battery predictions 338 may include one or more recommendations that are marked as alternatives, which may be necessary if a previous charging time is not available, such as if there is no power outlet available for recharging during the "rec2" time.

In one example, schedule service 112 may receive battery predictions 338 and update the events in user schedule 330 to include one or more events based on battery predictions 338, as illustrated by user schedule updated with battery predictions 340. In one example, schedule service 112 may further graphically specify events within user schedule updated with battery predictions 340 to distinguish recommended charging events from other types of events. For example, a schedule display 360 illustrates one example of a graphical output of user schedule updated with battery predictions 340 Schedule service 112 may graphically specify events based on battery predictions 338 in a way that distinguishes recommended charging events from other types of events in user schedule 330.

For example, schedule display 360 may include a selectable event indicator of meeting 342, which is a graphical indicator for event 332, and a selectable event indicator of charge 344, which is a graphical indicator for the battery prediction "rec1", where charge 344 may include a graphical indicator that distinguishes charge 344 from meeting 342, such as a dotted line around the selectable event of charge 344. In one example, a user may select the selectable event indicator of charge 344 to receive additional information about the devices that need are recommended to be charged and the recommended charging locations, if any. In an additional or alternate embodiment, a separate event indicator may be added to schedule display 360 for each of "device A" and "device B". In an additional or alternate embodiments, a charge recommendation may also be added into the description of the meeting 342 or the event indictor of meeting 342 may be adjusted graphically to indicate that charging is recommended as part of meeting 342.

In one example, schedule display 360 may include a selectable event indicator of scouting 346, which is a graphical indicator for event 334. In addition, schedule display 360 may include a selectable event indicator of charge 348, which is a graphical indicator of battery predictions "rec 2".

In one example, as a user progresses through the day, power service 110 may detect whether battery enabled device B 316 is charged between 4 and 5 PM, and may adjust the event indicator of charge 348 to graphically indicator whether the device was or was not recharged during charge 348. In another example, if schedule service 112 detects a recommendation that includes a recommended location of "if available", such as in "rec 2", schedule service 112 may prompt a user to provide additional information about the user's expected location during the recommendation time.

In one example, schedule display 360 may include a selectable event indicator of practice 350, which is a graphical indicator for event 336, and a selectable event indicator of charge 352, which is a graphical indicator for the battery prediction "rec3", where charge 352 may include a graphical indicator that distinguishes charge 352 from practice 350, such as a dotted line around the selectable event of charge 352. In one example, if power service 110 detects battery enabled device B 316 is charged between 4 and 5 PM, power service 110 may update battery predictions 338 and remove the recommendation of "rec 3", such that schedule service 112 may remove charge 352 from schedule display 360. In another example, recommendations that are alternatives, such as "rec 3", may be graphically marked as an alternative, such that a user may quickly visually see alternative times for charging a device. In another example, when a recommendation is marked as an alternative, such as "rec 3", schedule service 112 may prompt a user to indicate a preference between alternative recommended charging times. In one example, when a recommendation includes a location of "portable charger", schedule service 112 may graphically distinguish the selectable event indicator of charge 352 to indicate the charging recommendation includes a portable charger requirement, rather than a location.

In one example, while FIG. 3 is described with reference to power service 110 accessing power usage impact data from multiple sources, including individual current usage 314 from battery enabled device A 310, individual current usage 320 from battery enabled device B 316, user schedule 330 from schedule service 112, schedule history 322 from device history database 256, and charging locations mapping 324 from charging locations database 246, in additional or alternate embodiments, power service 110 may access additional or alternate power usage impact data sources including, but not limited to, data from computing device 218, data from other user data and schedule 250, data from device specs database 248, temperatures for locations from temperature service 252, and network access for locations from network mapping database 254.

Figure 4:
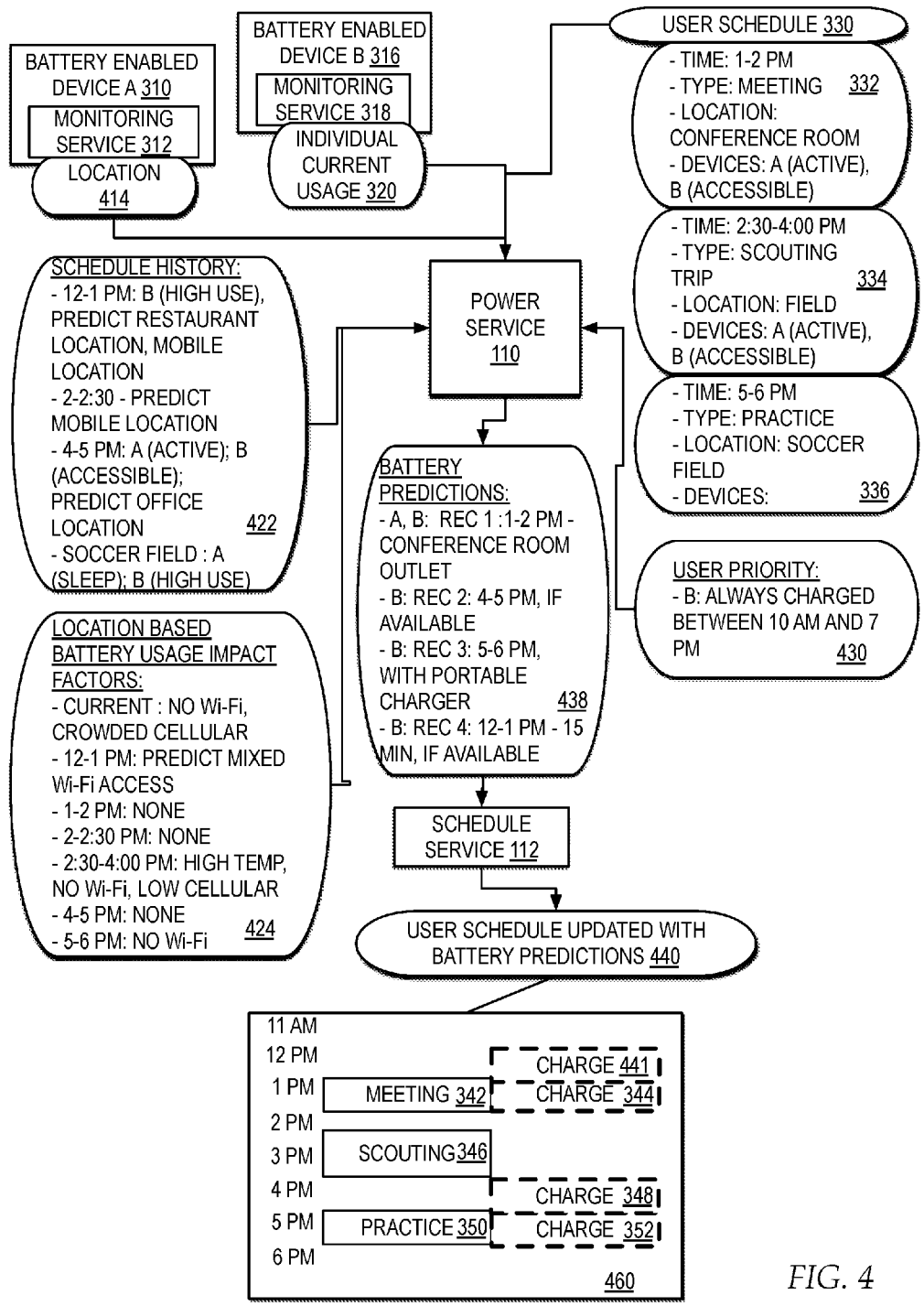
FIG. 4 illustrates one example of a block diagram of one example of a power service for optimizing a schedule of scheduled times and locations to charge battery enabled devices based on individual locations received from multiple battery enabled devices, a schedule of predicted usage of the multiple battery enabled devices, and location based battery usage impact factors.

FIG. 4 illustrates a block diagram of one example of a power service for optimizing a schedule of scheduled times and locations to charge battery enabled devices based on individual locations received from multiple battery enabled devices, a schedule of predicted usage of the multiple battery enabled devices, and location based battery usage impact factors.

In one example, for a particular user, power service 110 receives location 414 and individual current usage 320. In one example, as described in FIG. 3, each of a battery enabled device A 310 and a battery enabled device B 316 may each include a monitoring service, such as a monitoring service 312 and a monitoring service 318, respectively. Each of monitoring service 312 and monitoring service 318 may locally monitor current usage at a battery enabled device and output different selections of monitored usage. For example, while in FIG. 3 monitoring service 312 output individual current usage 314, with multiple types of usage information, in FIG. 4, monitoring service 312 may only output location 414, indicating a current location of battery enabled device A 310. Monitoring service 318 of battery enabled device B 316 may continue to output multiple types of usage information, including location, within individual current usage 320. As illustrated, in different examples, each monitoring service of each battery enabled device may monitor and output different types of usage information to power service 110.

In one example, for the particular user, power service 110 also receives user schedule 330, as described in FIG. 3. Calculation service 134 may receive user schedule 330 and analyze user schedule 330 to determine which portions of schedule 330 may require additional predictions to more accurately predict the optimum times and locations for charging the battery enabled devices. In particular, a user may not update user schedule 330 with every anticipated location or device use that day or may leave some events without full information about predicted locations and device use. In one example, calculation service 134 may analyze user schedule 330 to identify time periods that do not include any anticipated location or device use, such as a time period prior to event 332, a time period of "2-2:30" between event 332 and 334, and a time period of "4-5 PM" between event 334 and event 336. In one example, calculation service 134 may analyze user schedule 330 to identify characteristics of events that do not specify predicted device usage, such as a type of "practice" and a location of "soccer field" in event 336, which does not include a device usage prediction.

In one example, based on the missing predicted locations and device usage times and events identified by calculations service 134 in user schedule 330, power service 110 may search device history database 256 and analyze the previous schedules and device use by a particular user, for the missing usage times and events, to identify schedule history 422. In one example, for a time period prior to event 332 of "12-1 PM", schedule history 422 includes a predicted use of "device B", a predicted level of use of "high use", a predicted location of a restaurant location, and a predicted location of mobile locations, where the "12-1 PM" time window may represent a lunch break for the user, during which the user frequently uses applications that require higher amounts of energy and frequently travels to and from a restaurant location. In one example, for a time period between events 332 and 334 of "2-2:30 PM", schedule history 422 includes a predicted location of a mobile location, without predicted device use, where the "2-2:30 PM" time window may represent time that is typically during work hours, but is predicted to include travel time from the location in event 332 to the location in event 334. In one example, for a time period of "4-5 PM", schedule history 422 includes a predicted use of "device A" and a predicted level of use of "active" and a predicted use of "device B" and a predicted level of use of "accessible", with a predicted office location, where the "4-5 PM" time window may represent a time period that is generally part of the user's work day at an office location, but may not be specifically scheduled in user schedule 330. In one example, for a location of "soccer field", schedule history 422 includes a predicted use of "device A" and a predicted level of use of "sleep" and a predicted use of "device B" and a predicted level of use of "high use", where the "soccer field" location may represent a non-work location where the user typically leaves battery enabled device A 310 in a sleep mode and where the user frequently uses applications that require higher amounts of energy.

In one example, calculation service 134 may search one or more of temperature service 252, network mapping database 254, and other user data and schedule 250, and device history database 256, along with additional resources available to power service 110, to identify a selection of current and predicted location based battery usage impact factors 424 for the locations predicted in user schedule 330 and schedule history 422. In one example, location based battery usage impact factors 424 may indicate factors detected at specific locations that may increase the rate at which battery power is used above a normal, or expected rate. For example, the availability of wireless network access (Wi-Fi) at a location may impact the rate at which battery power is used, where if no, low or mixed Wi-Fi is available, the battery enabled device may spend additional battery power, above a normal rate, searching for available networks or switching over to a cellular network. For example, the availability and strength of cellular network access at a location may impact the rate at which battery power is used, where if no, low, or mixed cellular access is available, the battery enabled device may spend additional battery power, above a normal rate, pinging cellular towers to search for available or stronger cellular networks. In another example, the availability of a cellular network access at a location may also impact the rate at which battery power is used if a larger than average number of users are using battery enabled devices in a particular area and the service strength and availability decreases to provide limited service to each user. For example, the temperature at a location may impact the rate at which battery power is used, where if temperatures are above or below thresholds, the rate at which a battery discharges may increase.

For example, location based battery usage impact factors 424 may include a time period of "current" and a factor of no wireless network (Wi-Fi) and "crowded cellular", based on network mapping database 254 for the current location or based on individual current usage 320, which may indicate network availability and load for a user's current location identified in location 414 and individual current usage 320. In the example, location based battery usage impact factors 424 may include a time period of "12-1 PM", and a factor of "predict mixed Wi-Fi access", based on network mapping database 254 and device history database 256 for the predicted locations of "restaurant location" and "mobile location" from locations predicted in schedule history 422. In the example, location based battery usage impact factors 424 may include a time period of "2:30-4:00 PM" and a factor of "high temp, no Wi-Fi, low cellular" based on temperature service 252, network mapping database 254, and device history database 256 for the predicted location of "field" based on the location specified in event 334. In the example, location based battery usage impact factors 424 may include a time period of "5-6 PM" and a factor of "no Wi-Fi" based on network mapping database 254 and device history database 256 for the predicted location of "soccer field" based on the location specified in event 336. In the example, location based battery usage impact factors 424 may also include time periods that are analyzed, but with no factors identified, such as a time period of "1-2 PM" and a factor of "none" for the predicted location of "conference room" based on the location specified in event 332, a time period of "2-2:30 PM" and a factor of "none" for the predicted location of "mobile location" based on the location specified in schedule history 422, and a time period of "4-5 PM" and a factor of "none" for the predicted location of "office location" based on the location specified in schedule history 422.

In one example, power service 110 may determine one or more optimum times and locations for recharging battery enabled device A 310 and battery enabled device B 316, based on location 414, individual current usage 320, user schedule 330, schedule history 422, and location based battery usage impact factors, in view of one or more priorities for the user, such as a user priority 430. In one example, user priority 430 may include one or more types of priorities, specified by the user, by device, by time, or by other unit. In one example, user priority 430 includes a priority for a time period that a user prioritizes maintaining a charge in "device B" of 10 AM-7 PM. In one example, power service 110 may apply user priority 430 by selecting to add additional charging recommendation times and adding additional charging recommendation hardware to improve the chance that the user priority will be met.

In one example, schedule service 112 may receive battery predictions 438 and update user schedule 330 with one or more events, tasks, or other additions for one or more of the recommendations in battery predictions 438, as illustrated by user schedule updated with battery predictions 440. In one example, schedule service 112 may further graphically specify events within user schedule updated with battery predictions 340 to distinguish recommended charging events from other types of events. For example, a schedule display 460 illustrates one example of a graphical output of user schedule updated with battery predictions 440.

In one example, both battery predictions 338 and battery predictions 438 are calculated by power service 110 based on individual current usage 320, user schedule 330 and schedule histories predicted based on device history database 256 for the same battery enabled devices, for a particular user, and both include the same "rec 1", "rec 2", and "rec 3", however, in battery predictions 438, "rec 3" is not identified as an alternative, but an expected charging time. In one example, power service 110 may identify "rec 3" as expected, rather than alternative, based on a predicted increase in power required during the "2:30-4:00 PM" window when the temperatures are high, no Wi-Fi is available, and the cellular signal is low strength, such that even though "device B" is predicted in event 334 to be "accessible", there may be a higher impact on battery usage given the location based factors to maintain a cellular network connection and receive pushed data notification on "device B". Based on the location based battery usage impact factors for the "2:30-4:00 PM" window, power service 110 may calculate that the rate of battery discharge may significantly increase on "device B", such that even if the user is able to charge "device B" during a portion of the "4-5 PM" window, for the predicted high use of "device B" during the "5-6 PM" window, a portable charger may be necessary to ensure the battery remains charged for the duration of the time window.

Battery predictions 438, which power service 110 calculates based on location 414, the location predictions in schedule 422, location based battery usage impact factors 424, and user priority 430, may also include an additional recommendation of "rec 4", recommending that from "12-1 PM", the user charge "device B" for at least 15 minutes, if a power source is available. In particular, based on individual current usage 320 for the current location, with factors of "no Wi-Fi" and "crowded cellular", along with user priority 430 that "device B" remain charged between "10 AM and 7 PM", power service 110 may additionally recommend that the user find a location for at least 15 minutes of charging during the "12-1 PM" window in order to maintain a charged battery in "device B". As illustrated in schedule display 460, a selectable indicator of charge 441 is added for "rec 4" from battery predictions 438.

In one example, while FIG. 4 is described with reference to power service 110 accessing power usage impact data from multiple sources, including location 414 from battery enabled device A 310, individual current usage 320 from battery enabled device B 316, user schedule 330 from schedule service 112, schedule history 422 from device history database 256, and location based battery usage impact factors 424 from device history database 256, temperature service 252, and network mapping database 254, in additional or alternate embodiments, power service 110 may access additional or alternate power usage impact data sources including, but not limited to, data from computing device 218, data from other user data and schedule 250, and data from device specs database 248.

Figure 5:
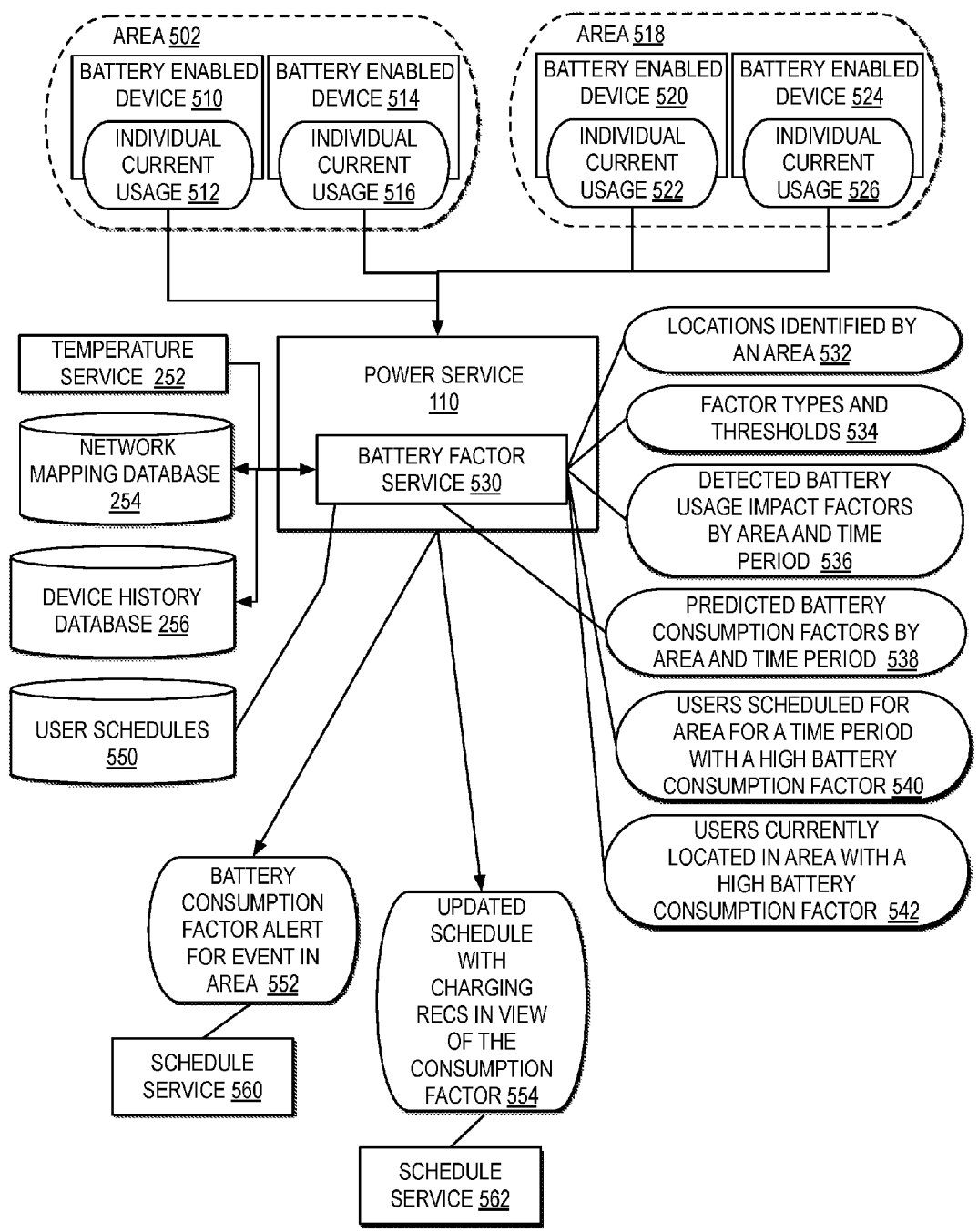
FIG. 5 illustrates one example of a block diagram of a power service for predicting battery consumption factors for an area based on battery usage information provided by multiple battery enabled device in the area and updating user schedules with an alert identifying predicted battery consumption factors above a threshold for an area.

FIG. 5 illustrates a block diagram of one example of a power service for predicting battery consumption factors for an area based on battery usage information provided by multiple battery enabled device in the area and updating user schedules with an alert identifying predicted battery consumption factors above a threshold for an area.

In one example, power service 110 may receive individual current usage from multiple battery enabled devices. For example, power service 110 may receive individual current usage 512 from battery enabled device 510, individual current usage 516 from battery enabled device 514, individual current usage 522 from battery enabled device 520, and individual current usage 526 from battery enabled device 524. In one example, individual current usage may include one or more of device data 240, environment data 242, and user data 244.

In one example, a battery factor service 530 may identify, from each selection of individual current usage record received, one or more usage values and a location. In one example, battery factor service 530 may store each individual current usage record received in device history database 256 with an identifier of the battery enabled device and time stamp. In one example, as battery factor service 530 stores each individual current usage record, battery factor service 530 may also access a temperature service 252 to determine a temperature for the location identified in the record and may store the temperature with the record. In addition, battery factor service 530 may access a network mapping database 254 for the location identified in the record to access network information about the location and may store the network information with the record.

In one example, battery factor service 530 may periodically search records in device history database 256 according to area. In one example, an area may include a particular mapped location or a range of mapped locations. In one example, battery factor service 530 may include a setting of locations identified by area 532 that specifies a range of locations specified for an area identifier. In one example, battery factor service 530 may search device history database 256 for records with locations specified for a particular area identifier and may also search for time stamps matching a specific time or a range of times.

In one example, battery factor service 530 may analyze the selected records returned from searching device history database 256 by area and by time. In one example, battery factor service 530 may analyze the selected records to determine values of one or more types of battery usage impact factors present in each area. In particular, factor types and thresholds 534 may identify one or more types of battery usage impact factors to identify including, but not limited to, temperature, weather conditions, network access, number of users, and use of applications with location based features. In one example, battery factor service 530 may analyze the selected records, in view of factors types and threshold 534, to generate detected battery usage impact factors by area and time period 536 for previous time periods and a current time period. In addition, battery factor service 530 may analyze temperature service 252, network mapping database 254 and user schedules 550 for multiple users, in view of factor types and thresholds 534, to generate detected battery usage impact factors by area and time period 536 for future time periods. For example, temperature service 252 may include weather predictions, network mapping database 254 may include indicators of temporary network facilities that are scheduled by location and time window in the future, and user schedules 550 for multiple users may include indications of the number of users who have scheduled events to be at a particular location and time window in the future.

In one example, battery factor service 530 may further analyze detected battery usage impact factors by area and time period 536 to generate predicted battery consumption factors by area and time period 538. In one example, battery factor service 530 may rate each of the types of battery consumptions factors by level and may calculating a consumption factor based on the combined ratings. The ratings may be set to predetermined thresholds and may also be adjusted for values reported in individual current usage records. For example, battery factor service 530 may generally rate a battery usage impact factor of a temperature below 95 degrees F. as a 0, but rate a temperature 95 to 98 as a 1 and a temperature higher than 98 as a 3, however, based on the actual battery usage reported in individual current usage records in an area, battery factor service 530 may adjust the ratings to reflect the reported impact of the temperature on the rate of battery discharge. For example, battery factor service 530 may generally rate a battery usage impact factor of use of a mapping location as a 1, but rate a use of an augmented reality application as a 3, however, based on the actual battery usage reported in multiple individual current usage records in the area, battery factor service 530 may adjust the ratings to reflect the impact of the use of the particular location application on the rate of battery discharge. For example, battery factor service 530 may generally rate a battery usage impact factor of an area with an average number of users as a 0, but increase the rating to reflect additional percentages of users in an area, however, based on the actual battery usage reported in multiple individual current usage records in the area, battery factor service 530 may adjust the ratings to reflect the reported impact of the number of users in an area on the rate of battery discharge. For example, battery factor service 530 may generally rate a battery usage impact factor of access to a Wi-Fi network as a 0, but rate lack of access to a Wi-Fi network as a 1, however, based on the actual battery usage reported in multiple individual current usage records in the area, battery factor service 530 may adjust the ratings to reflect the reported impact of the availability of Wi-Fi in an area on the rate of battery discharge. For example, battery factor service 530 may generally rate a battery usage impact factor of access to strong cellular service as a 0, but increase the rating for lower strengths of service, however, based on the actual battery usage reported in multiple individual current usage records in the area, battery factor service 530 may adjust the ratings to reflect the reported impact of the strength of cellular service in an area on the rate of battery discharge. In one example, the predicted battery consumption factor may be reflected in one or more types of units including, but not limited to, one or more numerical values, one or more percentages, one or more levels, and one or more additional unit identifiers.

In one example, battery factor service 530 may compare predicted battery consumption factors by area and time period 538 with factor types and thresholds 534 to identify if any battery consumption factors exceed the one or more threshold set in factor types and thresholds 534. In one example, factor types and thresholds 534 may also include different thresholds set for the battery consumption factors based on additional factors, such as time of day, day of the week, and length of time period.

In one example, if battery factor service 530 determines that a battery consumption factor for a particular area and time period exceeds one or more thresholds, battery factor service 530 may search a database of user schedules 550, including multiple user schedules managed by power service 110 for multiple subscribers, to determine if there are any users scheduled to be in the area, during the time period that a battery consumption factor is indicated as exceeding a threshold. In one example, battery factor service 530 may include any users with events in user schedules 550 in the area during the time period in users scheduled for area for a time period with a high battery consumption factor 540.

In one example, if battery factor service 530 determines that a battery consumption factor for a particular area and time period exceeds one or more thresholds, battery factor service 530 may search a database of user schedules 550 and may also search the currently received individual current usage records, to determine if there are any users in the area, during a current time period, when the battery consumption factor is indicated as exceeding a threshold. In one example, battery factor service 530 may include any users currently detected in the area during the time period in users currently located in area with a high battery consumption factor 542.

In one example, for users scheduled for area for a time period with a high battery consumption factor 540, calculation service 134 may assess the battery consumption factor for the event in a user's schedule that is the area and determine what additional or updated charging recommendations are needed to accommodate the battery consumption factor within the user's schedule as a whole. For each user identified to be scheduled in the area during the time period, calculation service 134 may assess the user's schedule in view of the battery consumption factor and recommendation service 138 may output an updated schedule with charging records in view of the consumption factor 554 to a schedule service 562.

In one example, for users currently located in an area with a high battery consumption factor 542, calculation service 134 may also assess the battery consumption factor for the event in a user's schedule that is the area and determine what additional or updated charging recommendations are needed to accommodate the battery consumption factor within the user's schedule as a whole. For each user with a mobile device in the area during the time period, calculation service 134 may assess the user's schedule in view of the battery consumption factor and recommendation service 138 may output an updated schedule with charging records in view of the consumption factor 554 to a schedule service 562. In addition, for users currently located in an area with a high battery consumption factor 542, recommendation service 138 may automatically generate a battery consumption factor alert for the event in area 552 and output the alert to a schedule service 560 for each user. In one example, schedule service 560 may push battery consumption factor alert for event in area 552 to the user's schedule, for output in the schedule display interface or for output in a scheduled event popup alert window.

In one example, an area, such as area 502 may have a high temperature condition, such as a temperature above 98 degrees F. In one example, based on battery factor service 530 detecting from temperature service 252 that battery enabled device 510 and battery enabled device 514 are in area 502 with a high temperature condition, battery factor service 530 may detect a battery consumption factor predicting that batteries will discharge at a faster rate in area 502. In the example, by battery factor service 530 also accessing individual current usage 512 and individual current usage 516, battery factor service 530 may more accurately predict the battery consumption factor based on actual discharge rates of batteries in use in area 502. Further, by battery factor service 530 also accessing individual current usage 512 and individual current usage 516 from battery enabled devices in area 502, battery factor service 530 may also determine a number of users in the area and detect whether other battery usage impact factors are impacting the rate at which batteries discharge within area 502. For example, based on individual current usage reported by battery enabled device 510 and battery enabled device 514 in an area 502, battery factor service 530 may detect that the impact of a higher temperature in an area and 500% increase in the number of users accessing Wi-Fi and cellular service over an hour, is causing the rate of discharge of batteries in battery enabled device 510 and battery enabled device 514 to increase. Battery factor service 530 may alert the users of battery enabled device 510 and battery enabled device 514 that the conditions in the area have triggered a high battery consumption factor and alert users scheduled to enter the area soon that the conditions in the area have triggered a high battery consumption factor, so that if an area has unexpected conditions that significantly reduce the expected battery life remaining, users are notified of the unexpected conditions. In addition, battery factor service 530 may detect, from looking at previously detected battery usage impact factors by area and time period 536, whether there is a pattern of high temperatures and a similar increase in the number of users accessing Wi-Fi and cellular service during previous time periods and predict a similar battery consumption factor for a future time period, according to the pattern, so that if the area regularly has the conditions according to a pattern, such as during scheduled outdoor events during the summer, users scheduled to attend the upcoming scheduled outdoor events in the area are alerted to the battery consumption factor in the area.

For example, based on individual current usage reported by battery enabled device 520 and battery enabled device 524 in an area 518, along with individual current usage reported by other battery enabled devices over multiple time periods and stored in device history database 256, battery factor service 530 may identify specific locations in an area 518 where there is no cellular access or where there is cellular access, but is low strength and frequently drops out. In one example, while network mapping database 254 may include mapped locations for area 518 illustrating network signals provided by a cellular provider, which may indicate no service or low service areas, battery factor service 530 uses the individual current usage collected from battery enabled devices present in area 518, over time, to determine the battery consumption factor for area 518 caused by the actual no service or low service conditions. By detecting the battery consumption factor for area 518, battery factor service 530 may evaluate common routes in area 518 and recommend locations where users turn off battery enabled devices and where users turn on battery enabled devices, along with adjusting the battery consumption factor for temperature, application use, and other battery usage impact factors for the route. For example, if area 518 represents a hiking route in a remote area, users of the hiking route may bring battery enabled devices and periodically use mapping applications or communication applications. Battery factor service 530 may detect battery consumption factors for different locations along the hiking route, as well as available power sources in area 518 or in areas next to area 518, and recommend both charging times and locations as well as recommending locations where, to conserve the available battery life, the battery enabled device should be powered off or cellular service turned off.

For example, based on individual current usage reported by battery enabled device 510 and battery enabled device 514 in area 502, along with individual current usage reported by other battery enabled devices over multiple time periods and stored in device history database 256, battery factor service 530 may detect time periods when use of a particular application or type of application is higher in area 502 and calculate a battery consumption factor for a particular time period. Based on the battery consumption factor for area 502 for a particular time period, power service 110 may predict that users who frequently use the particular application when they are in the area are likely to use the particular application when scheduled to be in area 502 and may adjust battery charging recommendations based on the battery consumption factor impacted by predicted use of the particular application. For example, device history database 256 may include records indicating that a user periodically plays an augmented reality game, which may be location based. Battery factor service 530 may detect, from individual current usage reported by battery enabled devices in area 502 that use of the augmented reality game is high in area 502 during particular time windows. A user may not take the time to schedule events for use of the automated reality game, however, if power service 110 detects the user schedule includes an event in area 502 during one of the particular time windows, power service 110 may predict that because the battery usage impact factors for area 502 indicate a high rate of use of the augmented reality game, the user will access the augmented reality game while in area 502 and determine charging recommendations based on the battery consumption factor for area 502 including the application based battery usage impact factor.

Figure 6:
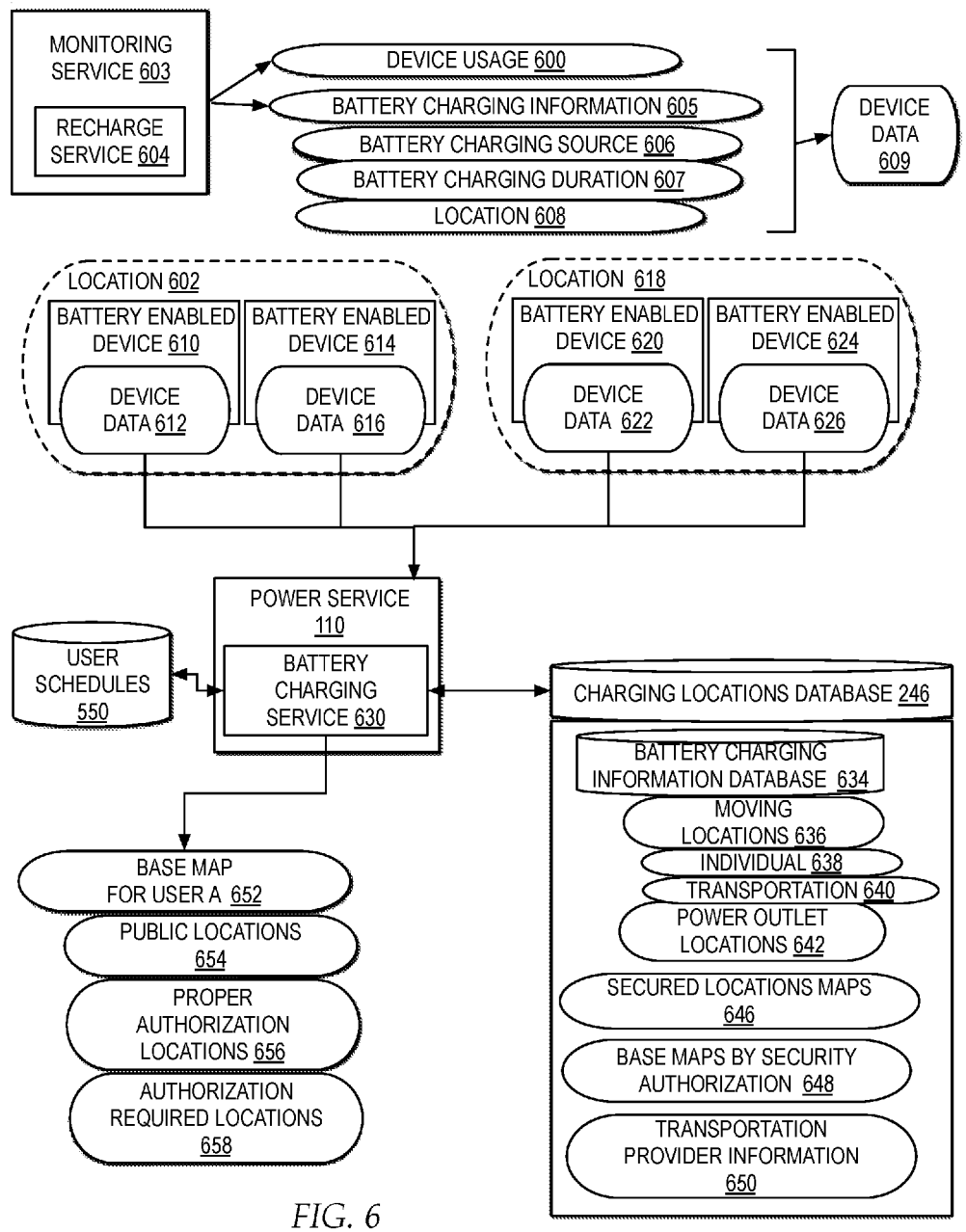
FIG. 6 illustrates one example of a block diagram of specifying charging locations by user based on battery charging information reported by battery enabled devices to a power service.

FIG. 6 illustrates one example of a block diagram of specifying charging locations by user based on battery charging information reported by battery enabled devices to a power service.

In one example, as previously described in FIG. 2, each battery enabled device may include a monitoring service, such as monitoring service 603, that locally monitors one or more aspects of usage of a battery enabled device. In one example, as illustrated in FIG. 6, monitoring service 603 may include a recharge service 604 that monitors usage of a battery enabled device while the battery enabled device is being recharged.

In one example, when monitoring service 603 detects that a battery enabled device is being recharged, recharge service 604 may detect one or more aspects of battery usage during recharging, illustrated as battery charging information 605. For example, recharge service 604 may detect one or more aspects of the battery usage during recharging including, but not limited to, a battery charging source 606, a battery charging duration 607, and a location 608. Monitoring service 603 may include battery charging information 605, along with any other information locally monitored about usage of a battery enabled device as device usage 600, in device data 609 provided by monitoring service 603 to power service 110. In on example, device usage 600 may also include additional information about usage of a battery enabled device including, but not limited to battery life, application usage, historical usage for a current time, and other usage information identified, analyzed, and collected by monitoring service 603.

For example, recharge service 604 may detect, by analyzing the characteristics of the recharging power or a signal output from the power source, a type of battery charging source 606. In one example, by analyzing the characteristics of the recharging power and recharging signals, recharge service 604 may determine whether a power source is an AC power outlet, a DC to AC converted power outlet, a USB charger, or a solar charger. In addition, in one example, a power source may actively or passively output data, through a wireless or wired medium, indicating the type of power source. Recharge service 604 may include a reader for actively or passively reading data output by a power source. Recharge service 604 may read additional types of information output by a power source, such as, but not limited, to a type of power source, a number of outlets of the power source, a charging power of the power source, an amount of power remaining in the power source, and any limits on use of the power source.

In one example, recharging service 604 may track, in battery charging duration 607, a start time, when a battery enabled device begins recharging from a power source, an end time, when a battery enabled device is removed from the power source, along with one or more times that indicate the charge level of the device, such as a full charge time, when a battery enabled device is fully charged. In addition, in one example, recharging service 604 may track, during the duration of battery charging, in location 608, each separate location of the battery enabled device. In one example, by tracking the location of the battery enabled device for the duration of a recharge, location 608 may indicate whether the power source is in a fixed location or is portable.

In one example, multiple battery enabled devices may each include an instance of monitoring service 603, with an instance of recharge service 604, for locally tracking battery usage during recharging, and each outputting device data including battery charging source 606, battery charging duration 607, and location 608. In one example, a battery enabled device 610 and battery enabled device 614 are currently recharging at a location 602 and a battery enabled device 620 and battery enabled device 624 are current charging at a location 618. In one example, an instance of monitoring service 603 on battery enabled device 610 tracks and outputs device data 612, an instance of monitoring service 603 on battery enabled device 614 tracks and outputs device data 616, an instance of monitoring service 603 on battery enabled device 620 tracks and outputs device data 622, and an instance of monitoring service 603 on battery enabled device 624 tracks and outputs device data 626.

In one example, power service 110 may receives device data from multiple battery enabled devices and may include a battery charging service 630 for identifying the elements of battery charging information 605 within device data 609. For example, battery charging service 630 may search for the elements of battery charging source 606, battery charging duration 607, and location 608 within device data 612, device data 616, device data 622, and device data 626.

In one example, battery charging service 630 may store, by location, in battery charging information database 634, elements of battery charging information 605 identified in device data 612, device data 616, device data 622, and device data 626, along with additional battery charging information received at other times from the same battery enabled devices or received from other battery enabled devices over time.

In one example, battery charging service 630 may analyze the entries in battery charging information database 634 to identify battery charging information that includes multiple locations, and identify each record that identifies a power source that is a moving charging location in moving locations 636. In one example, in marking moving locations 636, battery charging service 630 may further identify each of the locations marked in moving locations 636 as individual 638, indicating that the power source is likely an individual, portable charger available to a particular user or transportation 640, indicating that the power source is likely available in a transportation system, such as in a vehicle, plane, train, or other transportation option. In one example, battery charging service 630 may detect that a battery charging source is a type of USB charger, and the location mobile, and mark the battery charging source in moving locations 636 as individual 638, along with identifying a particular user associated with the battery enabled device reporting the device data. In another example, battery charging service 630 may detect that a battery charging source is a type of DC to AC charger, and the location is mobile, and mark the battery charging source in moving locations 636 as transportation 640. In one example, by distinguishing moving locations by individual movement and transportation movement, battery charging service 630 may identify, in charging locations database 246, which moving locations 636 are available to a particular user, indicated by individual 638, and which moving locations 636 are potentially available within transportation options, indicated by transportation 640.

In addition, battery charging service 630 may further identify the specific transportation option associated with records within transportation 640 by matching the locations in records in transportation 640 with transportation provider information 650 to identify particular power sources within transportation options. For example, transportation providers may provide power service 110 with information about transportation option routes and the power sources within the transportation options, such as an airline provider providing information about a travel route for each flight and the power sources within the aircraft used for the flight. Battery charging service 630 may identify that device data returned from a battery enabled device includes multiple locations, is not individual, and In another example, battery charging service 630 may further identify the specific transportation option associated with records within transportation 640 by matching the locations in records in transportation 640 with transportation provider information in a user's schedule for an event at the location. For example, battery charging service 630 may access user schedules 550, including multiple user schedules, and identify an event in a particular user's schedule that matches with the time period that the user's battery enabled device reports device data. The identified event in user schedules 550 may include information about the user's travel, such as a particular airline that the user is scheduled to fly on, the aircraft identification, and the power sources available on the aircraft. Battery charging service 630 may update the record for a moving location in transportation 640 with the aircraft identifier and power sources identified in the identified event.

In one example, battery charging service 630 may determine, after filtering out moving locations 636 from battery charging information database 634, one or more power outlet locations 642 from battery charging information database 634. In one example, battery charging service 630 may filter charging locations database 246 to remove moving locations 636 and records with a battery charging source, a USB charger, solar charger, or DC to AC charger that are not identified within moving locations 636. In one example, while some battery charging source information received in device data may indicate that a power source is a power outlet, some battery charging source information received in device data may not specifically identify a charging source that is a power outlet.

In one example, charging locations database 246 may include secured locations maps 646, which include one or more maps provided by organizations, governments, administrators, individuals, or others that specify specific locations that require security authorization of some type for entry. In one example, a map in secured locations maps 646 may identify the type of authorization that a user is required to have to enter the area and may indicate whether a power source is restricted from display to users who do not have the type of authorization. For example, a ticket-only event arena may load a map of an arena into secured locations maps 646 that identifies ticket-only entry areas, but not does not restrict the locations of power sources within the areas from being displayed to all uses, however, a company with secured areas accessible only to authorized users and authorized guests may load a map into secured locations maps 646 indicating that a user may have an electronic authorization to enter an area and to view the power sources in the area. In one example, a map in secured locations map 646 may also identify a time period when an area is secured and requires authorization to enter, such as a map identifying a time period for a temporary outdoor event in a park. In addition, a map in secured locations maps 646 may identify a time period when an area is accessible to the public and a time period when an area is only accessible with a specific type of authorization. In one example, some types of areas, such as residential areas, may be automatically marked in secured locations maps 646 as requiring authorization.

In one example, battery charging service 630 may filter power outlet locations 642 and transportation 640 through secured locations maps 646 to identify a selection of base maps by security authorization 648. In one example, base maps by security authorization 648 may include each power outlet identified in power outlet locations 642 and each power source identified in transportation 640 identified by whether the location is publicly accessible or whether the location requires a security authorization, and the level of security authorization. In addition, base maps by security authorization 648 may further specify the time periods when security authorization is required.

In one example, calculation service 134 of power service 110 may request that battery charging service 630 specify a base map of power outlets for a particular user, such as "user A", for one or more locations and periods of time. Battery charging service 630 may select a base map for the one or more locations from base maps by security authorization 648, and further specify the base map, in a base map for user A 652, to only show the locations available to the particular user, for the user's authorization settings, and for the particular periods of time. For example, base map for user A 652 may be specified with a selection of public locations of power sources available to all users, identified as public locations 654. For base map for user A 652, battery charging service 630 may filter out any power source locations from base maps by security authorization 648 that "user A" does not have authorization to enter or that are not accessible during the time periods. In determining the authorizations of "user A", battery charging service 630 may check one or more digital credentials for a user, such as a user's network security credentials or a user's registration credentials. In another example, in determining the authorization of "user A", battery charging service 630 may check whether a user's schedule or electronic mail indicates the user has purchased a ticket for an event or for travel, to receive permission to enter an area. In yet another example, in determining the authorization of "user A", battery charging service 630 may prompt a user to indicate whether the user has a certain type of required authorization for a location when filtering base maps by security authorization 648. Battery charging service 630 may identify power sources included in base map for user A 652 to distinguish the power sources the user is detected as having the authorization to access, in proper authorization locations 656, from the power sources that require authorization, but the user may or may not be authorized to access, in authorization required locations 658.

Battery charging service 630 may initially specify base map for user A 652 and provide base map for user A 652 to power service 110. Calculation service 134 may further specify base map for user A 652 when determining optimum times and locations for charging battery enabled devices for "user A" and select particular charging locations from the power sources identified in base map for user A 652. In addition, recommendation service 138 may select to send base map for user A 652 to schedule service 112 for "user A", in battery predictions 114, for output with user schedule with charging recs 118. In one example, recommended locations may be highlighted in base map for user A 652 when displayed to a user. In another example, base map for user A 652 may be imported into an existing mapping and navigation application at a battery enabled device, such that "user A" may view power sources available to the user in areas close to the user in the event the user needs to look for or receive directions to power sources in an area.

Figure 7:
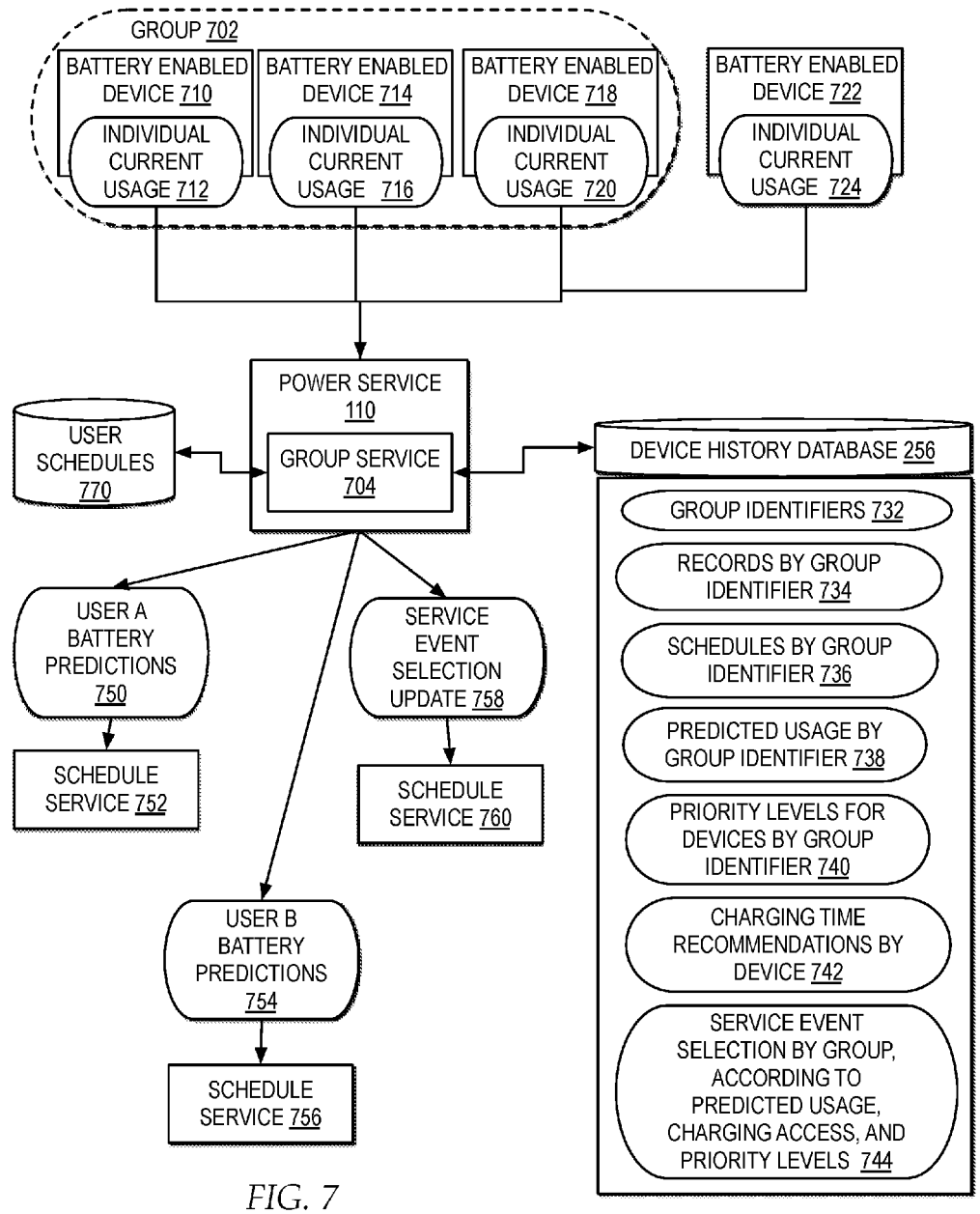
FIG. 7 illustrates one example of a block diagram of a power service for prioritizing recharging of multiple battery enabled devices identified within a group.

FIG. 7 illustrates a block diagram of one example of a power service for prioritizing recharging of multiple battery enabled devices identified within a group.

In one example, multiple battery enabled devices may report individual current usage to power service 110, such as battery enabled device 710 reporting individual current usage 712, battery enabled device 714 reporting individual current usage 716, battery enabled device 718 reporting individual current usage 720, and battery enabled device 722 reporting individual current usage 724. In one example, battery enabled device 710, battery enabled device 714 and battery enabled device 718 may represent devices identified in a same group within group identifiers 732, illustrated as group 702. In one example, battery enabled device 722 may be in another group, or not assigned to a group. A single battery enabled device may be identified within multiple groups.

In one example, group identifiers 732 within device history database 256 may include groups identified by one or more group aspects including, but not limited to, identifiers of one or more specific battery enabled devices, identifiers of one or more specific types of battery enabled devices, identifiers of one or more specific users, identifiers of one or more specific locations, and identifiers of one or more specific event types. In one example, as power service 110 receives individual current usage records, group service 704 analyzes group aspects of each individual current usage record received, dynamically determines a group identifier from group identifiers 732 associated with each individual current usage record, and dynamically assign each individual current usage record a group identifier in records by group identifier 734. In one example, group 702 may be dynamically identified in group identifiers 732 based on a location of battery enabled devices, where group service 704 detects a same particular location identified in each of individual current usage 712, individual current usage 716, and individual current usage 720 and matching a location in group identifiers 732 and assigns each of the individual current usage records a group identifier for the particular location in records by group identifier 734. When the group identifier is assigned by location, as the location of a battery enabled device moves away from the location, group service 704 may adjust records by group identifier 734 to remove the battery enabled device from the group. In another example, group 702 may be dynamically identified in group identifiers 732 based on user identifiers of a selection of authorized users, where group service 704 detects the user identifiers associated with individual current usage 712, individual current usage 716, and individual current usage 720 match user identifiers for an authorized users group in group identifiers 732 and assigns each of the individual current usage records a group identifier for the authorized users group in records by group identifier 734.

In one example, group service 704 may also analyze one or more schedules from user schedules 770, and dynamically identify a group identifier associated with a schedule or a particular event in a schedule. In one example, group service 704 may dynamically assign one or more schedules or events a group identifier in schedules by group identifier 736. For example, for group identifiers 732 based on location, if an event in user schedules 770 is specified for the location, the event may be assigned the location group identifier in schedules by group identifier 738. In another example, for group identifiers 732 based on user identifier for an authorized users group, the events in user schedules 770 specified for the user identifier may be assigned the group identifier for the authorized users group. In another example, an event in user schedules 770 may be specified as a group event for a selection of user identifiers, where the event may be added to schedules by group identifier with a group identifier for the event group.

In one example, group service 704 may identify, from schedules by group identifier 736, for a particular group identifier, the predicted usage of one or more battery enabled devices in the group based on the selection of scheduled events. For example, a selection of schedules associated with group 702 in schedules by group identifier 736, group service 704 may predict the usage of battery enabled device 710, battery enabled device 714, and battery enabled device 718 based on the schedules.

In one example, for the grouping of battery enabled devices, for one or more users, based on the individual current usage received for each battery enabled and the predicted usage for the group, device group service 704 may prioritize the recharging of each of the battery enabled devices at one or more power sources available for the group and assign a priority level to each battery enabled device in the group in priority levels for devices by group identifier 740. In one example, the priority level may indicate a priority that the device is recharged to be available for use by the group or to be available for use at another event not including the group. In one example, priority levels may include an ordering of the priority of each battery enabled device, where each battery enabled device is assigned a separate position in the ordering. In another example, priority levels may include assignment of a level of priority, such as a "high", "medium", or "low" priority, where one or more battery enabled devices may be assigned each level of priority.

In one example, group service 704 may further specify charging time recommendations for each battery enabled device, within a group, according to the predicted usage and priority levels assigned to the device in the group, and assign the charging time in charging time recommendations by device 742. In one example, charging time recommendations by device 742 may include a specific time or time window for charging a particular battery enabled device. In one example, charging time recommendations by device 742 may also include a specific location or selection of specific locations for charging a battery enabled device. Group service 704 may identify the available power sources in an area and select to distribute recommended power sources among the battery enabled devices to distribute the load on the power sources.

In one example, each of charging time recommendations by device 742 may be output by power service 110 in one or more battery predictions specified for particular users and sent to the user's schedule service to be added to the user's schedule. In one example, power service 110 may determine that battery enabled device 710 and battery enabled device 714 of group 702 are devices specified for a "user A" and specify the charging times for battery enabled device 710 and battery enabled device 714 in charging time recommendations by device 742 in user A battery predictions 750, sent to a schedule service 752 for handling a schedule for user A. In one example, power service 110 may determine that battery enabled device 718 of group 702 are devices specified for a "user B" and specify the charging times for battery enabled device 718 in charging time recommendations by device 742 in user B battery predictions 754, sent to a schedule service 756 for handling a schedule for user B. In yet another example, power service 110 may determine that battery enabled device 710 and battery enabled device 714 of group 702 are devices specified for a "user A" and that battery enabled device 718 of group 702 is a device specified for a "user B", and but include specifications for charging times for battery enabled device 710, battery enabled device 714, and battery enabled device 718 in user A battery predictions 750 and user B battery predictions 754, such that users of grouped battery enabled devices receive the schedule for charging of all the grouped battery enabled devices, even if the battery enabled devices are not all shared among the users in the group and individual users may be responsible for plugging in their battery enabled devices to recharge.

In one example, battery enabled device 710, battery enabled device 714, and battery enabled device 718 may be accessible to a group of two or more users who are in a meeting together or in a location together where there is a need to prioritize the recharging of the devices. In one example, the need to prioritize the recharging of the devices may arise if there is limited access to a power source and only a selected number of devices may charge at a time unless additional hardware is available to split a power source. In another example, the need to prioritize the recharging of the devices may arise if the users are moving among multiple locations during the event, and users need the devices to be portable for as long as possible before being tethered to a power outlet to recharge. In another example, the need to prioritize the recharging of the device may arise if the users are away from a power source, but one or more of the battery enabled devices may lose charge before the group returns to a power source, where the prioritization may indicate a prioritization of the order in which to use devices for specific tasks for the group, and the devices that should be turned off or conserved, so that at least one of the battery enabled devices has charge remaining throughout an event. In addition, additional or alternate conditions may trigger the need to prioritize the recharging of the group of devices available among multiple users.

In one example, group service 704 may identify charging time recommendations by device 742 for the group of battery enabled device 710, battery enabled device 714, and battery enabled device 718 in view of the current usage of the devices, the predicted usage of the devices based on schedules of users in the group, and the priority levels assigned to each of the battery enabled devices being available for use by the group. In one example, group service 704 may also effectively select, within charging time recommendations by device 742, which devices should be used for particular applications that may be required by the group during the meeting. For example, charging time recommendations by device 742 may specify a priority to recharge portable telephone devices at the beginning of a meeting, and to run the particular applications on the remaining power on a portable laptop device first, where charging time recommendations by device 742 may specify charging time recommendations for the portable telephone devices within a first time window, while the portable laptop device is being used, and a second time window for recharging the portable laptop device, once portable telephone devices are charged. In another example, charging time recommendations by device 742 may, in response to detecting that one or more of the battery enabled devices in group 702 may run out of power before an event is completed and the devices may be recharged, recommend an order in which the devices should be used to host the particular applications, to conserve some devices while others are being used.

In one example, group service 704 may identify charging time recommendations by device 742 for the group of battery enabled device 710, battery enabled device 714, and battery enabled device 718 in group 702, grouped according to the detected location of each of the battery enabled devices. In one example, charging time recommendations by device 742 may effectively schedule use of power source locations identified by group service 704. For example, in an airport terminal where users frequently need to use battery enabled devices and also recharge the battery enabled devices, group service 704 may dynamically identify the battery enabled devices within an area of an airport terminal within an airport group. Group service 704 may identify the power sources available for recharging multiple battery enabled devices in the airport group and select, based on individual current use and predicted use of the battery enabled devices in the airport group, including scheduled events to leave the area based on flight departure event times, a prioritization for charging each of the battery enabled devices and an identification of one or more power sources, from among the multiple power sources, recommended for each user. In one example, group service 704 may specify charging time recommendations by device 742 with a time window and one or more locations for charging. In one example, group service 704 may, in selecting time recommendations by device 742, effectively distribute battery enabled devices of different priority levels to different power sources within the area, to distribute the load on each power source.

In one example, group service 704 may also determine, if a service event is scheduled in schedules by group identifier 736, where in a group of battery enabled devices, only a selection of one or more of the battery enabled devices needs to be scheduled for use during an event. For example, a service event may include a scheduled service call to fix a utility issue, where the utility may be located in a remote area where power sources are not readily available or may require portable use of a battery enabled device for long periods of time. The service event may specify that one or multiple technicians in a group may be finally scheduled for the service call, based on availability of the technicians. In one example, each of the battery enabled devices accessible to each of the technicians may be specified in a group identified in group identifiers 732 or may be specified in a group identified in the service event. In one example, group service 704 may prioritize the recharging of the group of battery enabled devices and also select the selection of battery enabled devices and selection of one or more technicians to send to the service event. In one example, group service 704 may specify the service event selection in user service selection by group, according to predicted usage, charging access, and priority levels 744. In one example, power service 110 may apply the selections in service event selections 744 to the service event from user schedules 770 and send service event selection update 758 to schedule service 760, such that schedule service 760 may update the scheduled service event with the service event selection of one or more selected technicians and one or more selected battery enabled devices from an available group.

Figure 8:
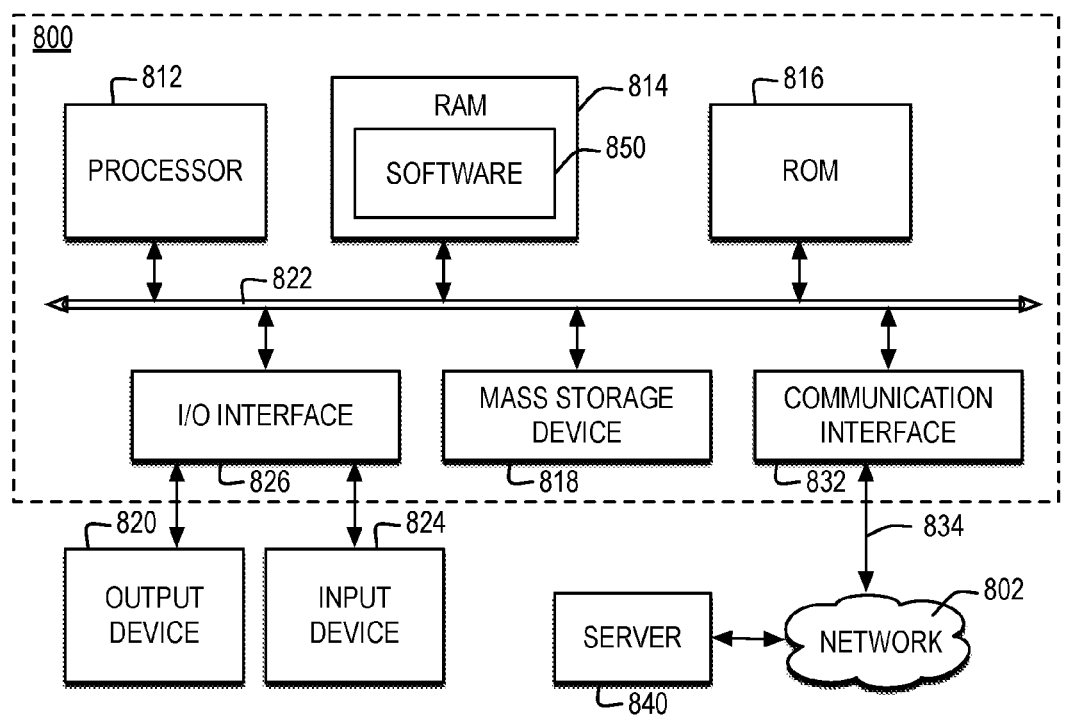
FIG. 8 illustrates one example of a block diagram of a computer system in which one embodiment of the invention may be implemented.

FIG. 8 illustrates a block diagram of one example of a computer system in which one embodiment of the invention may be implemented. The present invention may be performed in a variety of systems and combinations of systems, made up of functional components, such as the functional components described with reference to a computer system 800 and may be communicatively connected to a network, such as network 802.

Computer system 800 includes a bus 822 or other communication device for communicating information within computer system 800, and at least one hardware processing device, such as processor 812, coupled to bus 822 for processing information. Bus 822 preferably includes low-latency and higher latency paths that are connected by bridges and adapters and controlled within computer system 800 by multiple bus controllers. When implemented as a server or node, computer system 800 may include multiple processors designed to improve network servicing power.

Processor 812 may be at least one general-purpose processor that, during normal operation, processes data under the control of software 850, which may include at least one of application software, an operating system, middleware, and other code and computer executable programs accessible from a dynamic storage device such as random access memory (RAM) 814, a static storage device such as Read Only Memory (ROM) 816, a data storage device, such as mass storage device 818, or other data storage medium. Software 850 may include, but is not limited to, code, applications, protocols, interfaces, and processes for controlling one or more systems within a network including, but not limited to, an adapter, a switch, a server, a cluster system, and a grid environment.

Computer system 800 may communicate with a remote computer, such as server 840, or a remote client. In one example, server 840 may be connected to computer system 800 through any type of network, such as network 802, through a communication interface, such as network interface 832, or over a network link that may be connected, for example, to network 802.

In the example, multiple systems within a network environment may be communicatively connected via network 802, which is the medium used to provide communications links between various devices and computer systems communicatively connected. Network 802 may include permanent connections such as wire or fiber optics cables and temporary connections made through telephone connections and wireless transmission connections, for example, and may include routers, switches, gateways and other hardware to enable a communication channel between the systems connected via network 802. Network 802 may represent one or more of packet-switching based networks, telephony based networks, broadcast television networks, local area and wire area networks, public networks, and restricted networks.

Network 802 and the systems communicatively connected to computer 800 via network 802 may implement one or more layers of one or more types of network protocol stacks which may include one or more of a physical layer, a link layer, a network layer, a transport layer, a presentation layer, and an application layer. For example, network 802 may implement one or more of the Transmission Control Protocol/Internet Protocol (TCP/IP) protocol stack or an Open Systems Interconnection (OSI) protocol stack. In addition, for example, network 802 may represent the worldwide collection of networks and gateways that use the TCP/IP suite of protocols to communicate with one another. Network 802 may implement a secure HTTP protocol layer or other security protocol for securing communications between systems.

In the example, network interface 832 includes an adapter 834 for connecting computer system 800 to network 802 through a link and for communicatively connecting computer system 800 to server 840 or other computing systems via network 802. Although not depicted, network interface 832 may include additional software, such as device drivers, additional hardware and other controllers that enable communication. When implemented as a server, computer system 800 may include multiple communication interfaces accessible via multiple peripheral component interconnect (PCI) bus bridges connected to an input/output controller, for example. In this manner, computer system 800 allows connections to multiple clients via multiple separate ports and each port may also support multiple connections to multiple clients.

In one embodiment, the operations performed by processor 812 may control the operations of flowchart of FIGS. 9-13 and other operations described herein. Operations performed by processor 812 may be requested by software 850 or other code or the steps of one embodiment of the invention might be performed by specific hardware components that contain hardwired logic for performing the steps, or by any combination of programmed computer components and custom hardware components. In one embodiment, one or more components of computer system 800, or other components, which may be integrated into one or more components of computer system 800, may contain hardwired logic for performing the operations of flowcharts in FIGS. 9-13.

In addition, computer system 800 may include multiple peripheral components that facilitate input and output. These peripheral components are connected to multiple controllers, adapters, and expansion slots, such as input/output (I/O) interface 826, coupled to one of the multiple levels of bus 822. For example, input device 824 may include, for example, a microphone, a video capture device, an image scanning system, a keyboard, a mouse, or other input peripheral device, communicatively enabled on bus 822 via I/O interface 826 controlling inputs. In addition, for example, output device 820 communicatively enabled on bus 822 via I/O interface 826 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 8, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 8 may vary. Furthermore, those of ordinary skill in the art will appreciate that the depicted example is not meant to imply architectural limitations with respect to the present invention.

FIG. 9 illustrates a high level logic flowchart of a process and computer program for selecting and scheduling optimized times and locations for charging battery enabled devices based on power usage impact data received from multiple sources.

In one example, the process and computer program starts at block 900 and thereafter proceeds to block 902. Block 902 illustrates monitoring for power usage impact data from multiple sources. Next, block 904 illustrates receiving a user schedule. Thereafter, block 906 illustrates storing the power usage impact data and user schedule in a device status database according to a user identifier. Next, block 908 illustrates analyzing the power usage impact data and user schedule in view of one or more priorities to calculate one or more available times and locations for recharging the one or more battery enabled devices. Thereafter, block 910 illustrates selecting one or more optimum times and locations from among the available times and locations. Next, block 912 illustrates outputting battery predictions specifying the selected one or more optimum times and locations, specified by battery enabled device, to a schedule service for output in a user schedule, and the process ends.

FIG. 10 illustrates a high level logic flowchart of a process and computer program for updating a user schedule with one or more events for the one or more optimum times and locations recommended by a power service for charging one or more battery enabled devices.

In one example, the process and computer program starts at block 1000 and thereafter proceeds to block 1002. Block 1002 illustrates a determination whether a schedule service receives battery predictions, specifying one or more optimum times and locations, specified by battery enabled device, for a particular user. At block 1002, if a schedule service receives battery predictions for a particular user, then the process passes to block 1004. Block 1004 illustrates filtering the battery predictions according to one or more user preferences for battery predictions content. In one example, filtering the battery predictions according to user preferences for battery predictions content may include identifying certain types of content, such as alternative recommendations, or recommendations that include a power location of "as available" or "portable charger", where specific types of content may trigger additional alerts or prompts to a user, or where recommendations with specific types of content may be removed. Next, block 1006 illustrates adding or updating one or more events, for each of the filtered battery predictions, to the user schedule. Thereafter, block 1008 illustrates pushing the updated schedule to one or more user scheduling interfaces for the user, and the process ends.

FIG. 11 illustrates a high level logic flowchart of a process and computer program for monitoring individual monitored by a power service for charging one or more battery enabled devices.

In one example, the process and computer program starts at block 1100 and thereafter proceeds to block 1102. Block 1102 illustrates monitoring current application usage, battery status, Wi-Fi availability and strength, cellular availability and strength, temperature, location, and battery recharging status. Next, block 1104 illustrates storing the data monitored during a particular time window in a local usage database with a history of usage data at multiple times. Thereafter, block 1106 illustrates predicting, based on the data stored in the local usage database, a time remaining for a battery before recharge based on one or more of predicted application usage, rate of battery usage, predicted wifi and cellular availability, predicted temperatures, and predicted locations for upcoming time windows. Next, block 1108 illustrates a determination whether a battery recharging status is set to current recharging. At block 1108, if a battery recharge status is not set to current recharging, then the process passes to block 1112. At block 1108, if a battery recharging status is set to current recharging, then the process passes to block 1110. Block 1110 illustrates identifying, from charging source characteristics, a type of power source that the battery enabled device is recharging from. Next block 1112 illustrates outputting the individual current usage with the predicted time remaining, along with additional predicted data and any power source, to a power service, and the process ends.

FIG. 12 illustrates a high level logic flowchart of a process and computer program for updating charging events to reflect actual usage of a battery enabled device during an event period.

In one example, the process and computer program starts at block 1200 and thereafter proceeds to block 1202. Block 1202 illustrates a determination whether individual current usage is received from a battery enabled device. At block 1204, if individual current usage is received from a battery enabled device, then the process passes to block 1204. Block 1204 illustrates identifying one or more current events in a user's schedule that include predicted use of the battery enabled device. Next, block 1206 illustrates tracking, in a device history database, the individual current usage and whether the predicted usage of the battery enabled device matches with the individual current usage. Thereafter, block 1208 illustrates outputting an event update for each of the one or more current events in the user schedule to indicate the actual usage of the battery enabled device for the event period, and the process ends.

Figure 13:
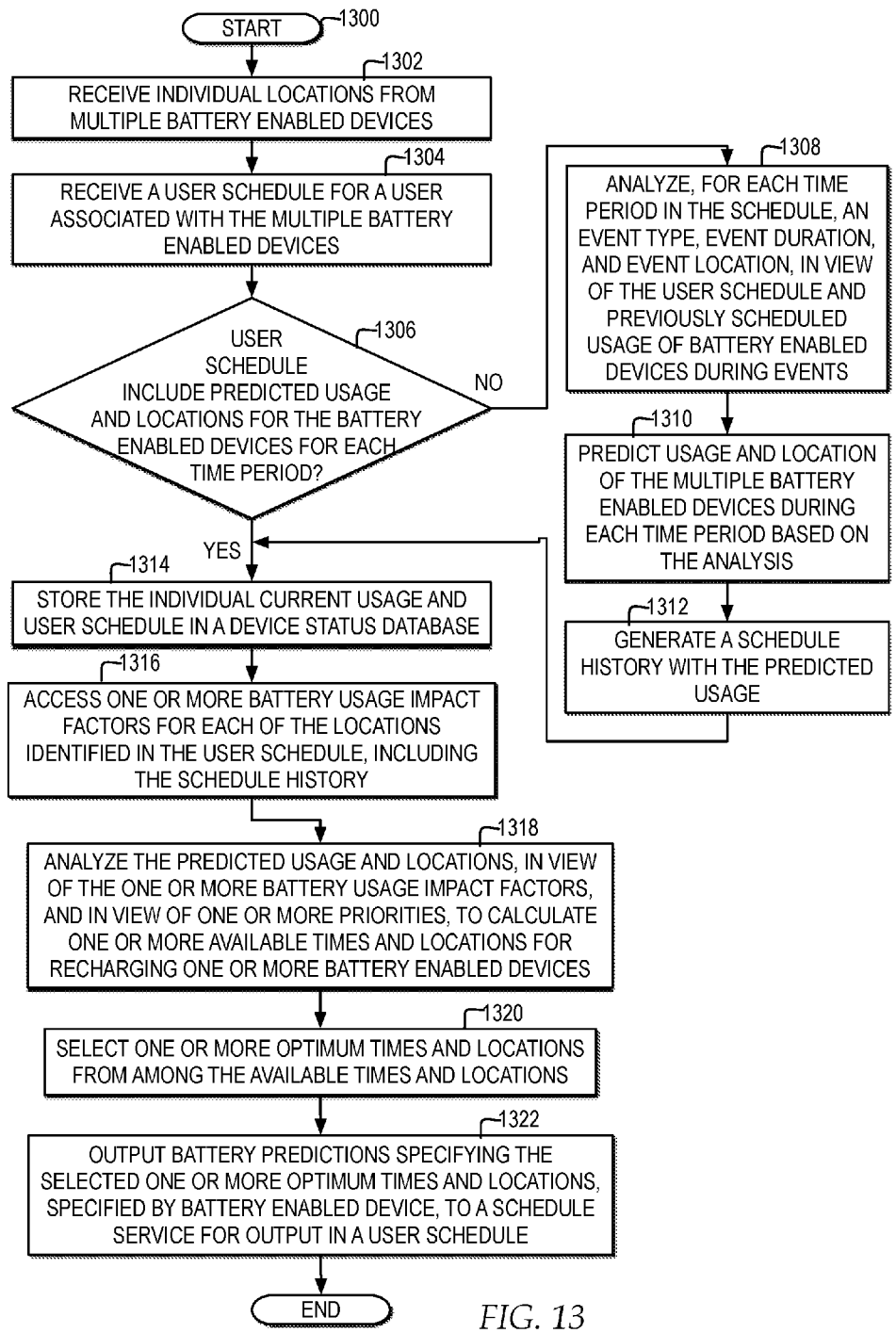
FIG. 13 illustrates one example of a high level logic flowchart of a process and computer program for optimizing a schedule of scheduled times and locations to charge battery enabled devices based on individual locations received from multiple battery enabled devices, a schedule of predicted usage of the multiple battery enabled devices, and location based battery usage impact factors.

FIG. 13 illustrates a high level logic flowchart of a process and computer program for optimizing a schedule of scheduled times and locations to charge battery enabled devices based on individual locations received from multiple battery enabled devices, a schedule of predicted usage of the multiple battery enabled devices, and location based battery usage impact factors.

In one example, the process and computer program starts at block 1300 and thereafter proceeds to block 1302. Block 1302 illustrates receiving individual locations from multiple battery enabled devices. Next, block 1304 illustrates receiving a user schedule for a user associated with the multiple battery enabled devices. Thereafter, block 1306 illustrates a determination whether a user schedule includes predicted usage and locations for the battery enabled devices for each time period. At block 1306, if a user schedule includes predicted usage and locations for the battery enabled devices for each time period, then the process passes to block 1314. At block 1306, if a user schedule does not include predicted usage and locations for the battery enabled devices for each time period, then the process passes to block 1308.

Block 1308 illustrates analyzing, for each time period in the schedule, an event type, an event duration and an event location, in view of the user schedule and previously scheduled usage of battery enabled devices during events. Next, block 1310 illustrates predicting device usage and location of the multiple battery enabled devices during each time period based on the analysis. Thereafter, block 1312 illustrates generating a schedule history with the predicted usage, and the process passes to block 1314.

Block 1314 illustrates storing the individual current usage and user schedule in a device status database. Next, block 1316 illustrates accessing one or more battery usage impact factors for each of the locations identified in the user schedule, including the schedule history. Thereafter, block 1318 illustrates analyzing the predicted usage and locations, in view of the one or more battery usage impact factors, and in view of one or more priorities, to calculate one or more available times and locations for recharging one or more battery enabled devices. Next, block 1320 illustrates selecting one or more optimum times and locations from among the available times and locations. Thereafter, block 1322 illustrates outputting battery predictions specifying the selected one or more optimum times and locations, specified by battery enabled device, to a schedule service for output in a user schedule, and the process ends.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method, comprising:
receiving, by a computer system, a user schedule of one or more events each specifying predicted usage and predicted location for future use of one or more battery enabled mobile devices at a predicted time;
for each event of the one or more events, accessing, by the computer system, one or more battery usage impact factors for each predicted location, the one or more battery usage impact factors comprising a predicted temperature at the predicted location at the predicted time and a predicted access to wireless network service and cellular network service for each predicted location, the one or more battery usage impact factors impacting performance of a separate battery within each of the plurality of battery enabled devices;

analyzing, by the computer system, the predicted usage and predicted location for each of the one or more events and the one or more battery usage impact factors to predict at least one recommended charging time and charging location for each of the one or more battery enabled mobile devices;

updating, by the computer system, the user schedule to specify at least one charging event for each at least one recommended charging time and charging location;

monitoring, by the computer system, the actual temperature at the predicted location when a current time matches the predicted time and the actual access to the wireless network service and cellular network service when a current time matches the predicted time; and dynamically adjusting, by the computer system, the at least one recommended charging time and charging location for each of the one or more battery enabled mobile devices according to at least one difference impacting performance of the separate battery between at least one of the actual temperature and the predicted temperature and the actual access to the wireless network service and cellular network service and the predicted access.

2. The method according to claim 1, wherein accessing, by the computer system, one or more battery usage impact factors for each predicted location further comprises:
   accessing, by the computer system, a predicted application usage for each predicted location.

3. The method according to claim 1, wherein analyzing, by the computer system, the predicted usage and predicted location for each of the one or more events and the one or more battery usage impact factors to predict at least one recommended charging time and charging location for each of the one or more battery enabled mobile devices further comprises:
   receiving, by the computer system, one or more types of individual current usage from one or more battery enabled devices; and
   analyzing, by the computer system, the predicted usage and predicted location for each of the one or more events, the one or more battery usage impact factors, and the one or more types of individual current usage, to predict the recommended charging time and charging location for each of the one or more battery enabled mobile devices.

4. The method according to claim 1, wherein receiving, by the computer system, a user schedule of one or more events each specifying predicted usage and predicted location for one or more battery enabled mobile devices further comprises:
   analyzing, by the computer system, for each time period in the user schedule, each of an event type, event duration, and event location, in view of previously scheduled usage of the one or more battery enabled devices;
   predicting, by the computer system, in each time period, one or more additional types of predicted usage of the one or more battery enabled devices during each time period based on the event type, event duration, and event location supplemented by previously scheduled usage of the one or more battery enabled devices; and
   updating, by the computer system, in the user schedule, in each time period, the event type, event duration, and event location with the one or more additional types of predicted usage.

5. The method according to claim 1, wherein analyzing, by the computer system, the predicted usage and predicted location for each of the one or more events and the one or more battery usage impact factors to predict at least one recommended charging time and charging location for each of the one or more battery enabled mobile devices further comprises:
   determining, by the computer system, at least one power source available at each predicted location; and
   selecting, by the computer system, in the separate recommended charging time and charging location, the predicted location at the charging time.

6. The method according to claim 1, wherein analyzing, by the computer system, the predicted usage and predicted location for each of the one or more events and the one or more battery usage impact factors to predict at least one recommended charging time and charging location for each of the one or more battery enabled mobile devices further comprises:
   identifying, by the computer system, a separate predicted usage for each of the one or more battery enabled mobile devices for each of the one or more events comprising a plurality of battery enabled mobile devices, wherein only a selection of the plurality of battery enabled mobile devices is used during each of the one or more events; and
   predicting, by the computer system, at least one recommended charging time and charging location based on the separate predicted usage to minimize a total amount of time required for charging each of the plurality of battery enabled mobile devices during a period of time comprising at least the one or more events, wherein the period of time is longer than a battery life of at least one battery of the selection of the plurality of battery enabled mobile devices.

7. The method according to claim 1, wherein analyzing, by the computer system, the predicted usage and predicted location for each of the one or more events and the one or more battery usage impact factors to predict at least one recommended charging time and charging location for each of the one or more battery enabled mobile devices further comprises:
   identifying, by the computer system, a separate predicted usage for each of the one or more battery enabled mobile devices for each of the one or more events comprising a plurality of battery enabled mobile devices, wherein only a selection of the plurality of battery enabled mobile devices is used during each of the one or more events; and
   predicting, by the computer system, a plurality of recommended charging times and charging locations based on the separate predicted usage to minimize a total number of charging times required for charging each of the plurality of battery enabled mobile devices during a period of time comprising at least the one or more events, wherein the period of time is longer than a battery life of at least one battery of the selection of the plurality of battery enabled mobile devices.

8. A computer system comprising one or more processors, one or more non-transitory computer-readable memories, one or more computer-readable storage devices, and program instructions, stored on at least one of the one or more storage devices for execution by at least one of the one or more processors via at least one of the one or more memories, the stored program instructions comprising:

program instructions to receive a user schedule of one or more events each specifying predicted usage and predicted location for future use of one or more battery enabled mobile devices at a predicted time;

program instructions, for each event of the one or more events, to access one or more battery usage impact factors for each predicted location, the one or more battery usage impact factors comprising a predicted temperature at the predicted location at the predicted time and a predicted access to wireless network service and cellular network service for each predicted location, the one or more battery usage impact factors impacting performance of a separate battery within each of the plurality of battery enabled devices;

program instructions to analyze the predicted usage and predicted location for each of the one or more events and the one or more battery usage impact factors to predict at least one recommended charging time and charging location for each of the one or more battery enabled mobile devices;

program instructions to update the user schedule to specify at least one charging event for each at least one recommended charging time and charging location;

program instructions to monitor the actual temperature at the predicted location when a current time matches the predicted time and the actual access to the wireless network service and cellular network service when a current time matches the predicted time; and program instructions to dynamically adjust the at least one recommended charging time and charging location for each of the one or more battery enabled mobile devices according to at least one difference impacting performance of the separate battery between at least one of the actual temperature and the predicted temperature and the actual access to the wireless network service and cellular network service and the predicted access.

9. The computer system according to claim 8, wherein the program instructions to access one or more battery usage impact factors for each predicted location further comprise:

program instructions to access a predicted application usage for each predicted location.

10. The computer system according to claim 8, wherein the program instructions to analyze the predicted usage and predicted location for each of the one or more events and the one or more battery usage impact factors to predict at least one recommended charging time and charging location for each of the one or more battery enabled mobile devices further comprise:

program instructions to receive one or more types of individual current usage from one or more battery enabled devices; and program instructions to analyze the predicted usage and predicted location for each of the one or more events, the one or more battery usage impact factors, and the one or more types of individual current usage, to predict the recommended charging time and charging location for each of the one or more battery enabled mobile devices.

11. The computer system according to claim 8, wherein the program instructions to receive a user schedule of one or more events each specifying predicted usage and predicted location for one or more battery enabled mobile devices further comprise:

program instructions to analyze, for each time period in the user schedule, each of an event type, event duration, and event location, in view of previously scheduled usage of the one or more battery enabled devices;

program instructions to predict, in each time period, one or more additional types of predicted usage of the one or more battery enabled devices during each time period based on the event type, event duration, and event location supplemented by previously scheduled usage of the one or more battery enabled devices; and program instructions to update, in the user schedule, in each time period, the event type, event duration, and event location with the one or more additional types of predicted usage.

12. The computer system according to claim 8, wherein the program instructions to analyze the predicted usage and predicted location for each of the one or more events and the one or more battery usage impact factors to predict at least one recommended charging time and charging location for each of the one or more battery enabled mobile devices further comprise:

program instructions to determine at least one power source available at each predicted location; and program instructions to select, in the separate recommended charging time and charging location, the predicted location at the charging time.

13. The computer system according to claim 8, wherein the program instructions to analyze the predicted usage and predicted location for each of the one or more events and the one or more battery usage impact factors to predict at least one recommended charging time and charging location for each of the one or more battery enabled mobile devices further comprises:

program instructions to identify a separate predicted usage for each of the one or more battery enabled mobile devices for each of the one or more events comprising a plurality of battery enabled mobile devices, wherein only a selection of the plurality of battery enabled mobile devices is used during each of the one or more events; and program instructions to predict at least one recommended charging time and charging location based on the separate predicted usage to minimize a total amount of time required for charging each of the plurality of battery enabled mobile devices during a period of time comprising at least the one or more events, wherein the period of time is longer than a battery life of at least one battery of the selection of the plurality of battery enabled mobile devices.

14. The computer system according to claim 8, wherein the program instructions to analyze the predicted usage and predicted location for each of the one or more events and the one or more battery usage impact factors to predict at least one recommended charging time and charging location for each of the one or more battery enabled mobile devices further comprises:

program instructions to identify a separate predicted usage for each of the one or more battery enabled mobile devices for each of the one or more events comprising a plurality of battery enabled mobile devices, wherein only a selection of the plurality of battery enabled mobile devices is used during each of the one or more events; and program instructions to predict a plurality of recommended charging times and charging locations based on the separate predicted usage to minimize a total number of charging times required for charging each of the plurality of battery enabled mobile devices during a period of time comprising at least the one or more events, wherein the period of time is longer than a battery life of at least one battery of the selection of the plurality of battery enabled mobile devices.

15. A computer program product comprises a computer readable storage medium having program instructions embodied therewith, wherein the computer readable storage medium is not a transitory signal per se, the program instructions executable by a computer to cause the computer to:
receive, by the computer, a user schedule of one or more events each specifying predicted usage and predicted location for future use of one or more battery enabled mobile devices at a predicted time;
for each event of the one or more events, access, by the computer, one or more battery usage impact factors for each predicted location, the one or more battery usage impact factors comprising a predicted temperature at the predicted location at the predicted time and a predicted access to wireless network service and cellular network service for each predicted location, the one or more battery usage impact factors impacting performance of a separate battery within each of the plurality of battery enabled devices;
analyze, by the computer, the predicted usage and predicted location for each of the one or more events and the one or more battery usage impact factors to predict at least one recommended charging time and charging location for each of the one or more battery enabled mobile devices;
update, by the computer, the user schedule to specify at least one charging event for each at least one recommended charging time and charging location;
monitor, by the computer, the actual temperature at the predicted location when a current time matches the predicted time and the actual access to the wireless network service and cellular network service when a current time matches the predicted time; and
dynamically adjust, by the computer, the at least one recommended charging time and charging location for each of the one or more battery enabled mobile devices according to at least one difference impacting performance of the separate battery between at least one of the actual temperature and the predicted temperature and the actual access to the wireless network service and cellular network service and the predicted access.

16. The computer program product according to claim 15, further comprising the program instructions executable by a computer to cause the computer to:
access, by the computer, a predicted application usage for each predicted location.

17. The computer program product according to claim 15, further comprising the program instructions executable by a computer to cause the computer to:
receive, by the computer, one or more types of individual current usage from one or more battery enabled devices; and
analyze, by the computer, the predicted usage and predicted location for each of the one or more events, the one or more battery usage impact factors, and the one or more types of individual current usage, to predict the recommended charging time and charging location for each of the one or more battery enabled mobile devices.

18. The computer program product according to claim 15, further comprising the program instructions executable by a computer to cause the computer to:
analyze, by the computer, for each time period in the user schedule, each of an event type, event duration, and event location, in view of previously scheduled usage of the one or more battery enabled devices;
predict, by the computer, in each time period, one or more additional types of predicted usage of the one or more battery enabled devices during each time period based on the event type, event duration, and event location supplemented by previously scheduled usage of the one or more battery enabled devices; and
update, by the computer, in the user schedule, in each time period, the event type, event duration, and event location with the one or more additional types of predicted usage.

19. The computer program product according to claim 15, further comprising the program instructions executable by a computer to cause the computer to:
identify, by the computer, a separate predicted usage for each of the one or more battery enabled mobile devices for each of the one or more events comprising a plurality of battery enabled mobile devices, wherein only a selection of the plurality of battery enabled mobile devices is used during each of the one or more events; and
predict, by the computer, at least one recommended charging time and charging location based on the separate predicted usage to minimize a total amount of time required for charging each of the plurality of battery enabled mobile devices during a period of time comprising at least the one or more events, wherein the period of time is longer than a battery life of at least one battery of the selection of the plurality of battery enabled mobile devices.

20. The computer program product according to claim 15, further comprising the program instructions executable by a computer to cause the computer to:
identify, by the computer, a separate predicted usage for each of the one or more battery enabled mobile devices for each of the one or more events comprising a plurality of battery enabled mobile devices, wherein only a selection of the plurality of battery enabled mobile devices is used during each of the one or more events; and
predict, by the computer, a plurality of recommended charging times and charging locations based on the separate predicted usage to minimize a total number of charging times required for charging each of the plurality of battery enabled mobile devices during a period of time comprising at least the one or more events, wherein the period of time is longer than a battery life of at least one battery of the selection of the plurality of battery enabled mobile devices.

* * * * *